US009892531B2

(12) United States Patent
Csenteri et al.

(10) Patent No.: US 9,892,531 B2
(45) Date of Patent: Feb. 13, 2018

(54) CHART DATA-BINDING DESIGN TIME USER EXPERIENCE WITH DYNAMIC SAMPLE GENERATION

(71) Applicant: Oracle International Corporation, Redwood Shores, CA (US)

(72) Inventors: Csaba Csenteri, Clifton, VA (US); David Brackman, Cambridge, MA (US)

(73) Assignee: Oracle International Corporation, Redwood Shores, CA (US)

( * ) Notice: Subject to any disclaimer, the term of this patent is extended or adjusted under 35 U.S.C. 154(b) by 40 days.

(21) Appl. No.: 14/789,430

(22) Filed: Jul. 1, 2015

(65) Prior Publication Data

US 2017/0004638 A1   Jan. 5, 2017

(51) Int. Cl.
*G06T 11/20* (2006.01)
*G06F 3/0486* (2013.01)
*G06F 17/24* (2006.01)

(52) U.S. Cl.
CPC .......... *G06T 11/206* (2013.01); *G06F 3/0486* (2013.01); *G06F 17/246* (2013.01)

(58) Field of Classification Search
CPC ....... G06T 1/00; G06T 11/206; G06F 3/0486; G06F 17/50; G06F 8/34; G06F 9/4425
See application file for complete search history.

(56) References Cited

U.S. PATENT DOCUMENTS

| | | | |
|---|---|---|---|
| 6,188,403 B1* | 2/2001 | Sacerdoti | G06F 17/30554 345/440 |
| 7,287,230 B2* | 10/2007 | Austin | G06F 3/0481 709/217 |
| 7,340,745 B2* | 3/2008 | Waldorf | G06F 9/4425 712/E9.082 |
| 7,737,979 B2* | 6/2010 | Robertson | G06T 11/206 345/440 |
| 7,890,198 B1* | 2/2011 | Gahinet | G06F 17/50 700/29 |
| 8,314,798 B2* | 11/2012 | Neelakantan | G06T 11/206 345/440 |
| 8,656,291 B2* | 2/2014 | Chasman | G06F 3/0486 715/763 |
| 8,963,922 B2* | 2/2015 | Li | G06T 1/00 345/440 |
| 2009/0319948 A1* | 12/2009 | Stannard | G06F 8/34 715/810 |

* cited by examiner

*Primary Examiner* — Devona Faulk
*Assistant Examiner* — Kevin Wu
(74) *Attorney, Agent, or Firm* — Trellis IP Law Group, PC

(57) ABSTRACT

A method and system for providing charting data visualizations of associated data sets is described. The method includes rendering a graphical user interface that includes one or more data interface regions. The one or more data interface regions are configured to detect and analyze a data interface component encoded with and representing data attributes which are mapped and bound to elements of a chart data visualization. Upon detecting the receipt of the graphical data interface component into the one or more data interface regions, the graphical data interface component is analyzed to determine the data attributes and the mapping. Based on the analysis of the data attributes and the data set, a data chart is rendered on a display and dynamically updated based on user interaction with the charting data visualization.

20 Claims, 15 Drawing Sheets

CHART DATA-BINDING DESIGN TIME USER EXPERIENCE WITH DYNAMIC SAMPLE GENERATION

BACKGROUND

Exemplary implementations are directed to a method and system for providing a graphical user interface that allows users to model, update, and maintain charting data visualizations.

Conventional chart data visualizations, such as charts rendered by spreadsheet programs, financial analysis tools, and the like, are commonly used to graph and display data sets in a chart format. Charts are typically used to display data set comparisons, relationships, distributions, trends, compositions, flows, processes, locations, etc. Charts are usually formed to compare data containing two or more attributes related to the data, e.g., the number of employees and the salary ranges for employees.

Typically, to generate a chart, a user will select or enter the data and the attributes pertaining to the data entered, and then choose a particular chart type to display such as a pie chart, diagram, bubble chart, funnel chart, line chart, radar/polar chart, etc. Once the chart is generated the user can make changes to the chart through manual interaction with the charting program or the data.

Charting visualizations in modern enterprise applications promotes insight into business processes and a better experience for customers using data visualization applications. Generally, generating charts in development environments such as meta-driven and declarative development environments is difficult due to the use of data-binding operations which are used to associate data located in abstract data sources with user interface components. As such, the chart visualization development process is often disconnected, relying on the application developer's understanding of how to effectively chart data within their application flows, types of charts used, and what is the best type of chart to visualize their data. Unfortunately, while the developer may use test data in these types of environments to mock up the charts, the developer generally has little experience in creating meaningful charting data visualizations using actual data.

When developing chart data visualizations, an application developer is generally more concerned about the application flow and providing user interface components that are able to connect to the abstract data sets. For example, the developer may use a test data set to make sure that the conventional charting data visualization is working, not whether they will achieve an expected visualization using the actual data.

The problem is further exacerbated by the fact that to determine whether the visualization for a particular data set is as expected would require the application developer to build, deploy, and run a sufficient subset of the charting application. Such a proposition is time consuming and inefficient.

Some systems have attempted to solve the above using Graphical User Interfaces (GUIs) using predefined templates that rely on displaying data visualization such as data charts in a generic predetermined fashion. Unfortunately, such conventional graphical user interface development tools generally require that the user adapt to the chart data visualization templates, or make extensive modifications to the templates, which ultimately may not be acceptable for the developer's or end user's run-time data visualization needs.

Therefore, a new and improved graphical user interface and charting data visualization system is desired to overcome the above.

SUMMARY

A method and system for providing a chart data visualization and associated data sets is described. The method includes rendering a graphical user interface that includes data interface regions or "hotspots." The data interface regions are considered "smart regions," configured to detect, interpret, analyze, and process data interface components and data elements received therein. Once the data interface component is received, for example, by a "drag-and-drop" action, the data interface region is configured to determine from the attributes of the data set associated with the interface data component, metadata, and the data set, the initial configuration of the chart data visualization. The chart data visualization is rendered on a display and dynamically updated based on user interaction with the chart data visualization. As additional interface data components and attributes are added or removed, the chart data visualization updates in real-time.

In one implementation, each of the data interface regions is configured as a client application in communication with a chart data visualization engine located on a server. The data interface region in combination with the chart data visualization engine may be used to receive and analyze data interface components encoded with a plurality of data attributes mapped to elements of chart data visualization. Alternatively, the data interface region may be part of the application flow that is distributed between the client and the server.

In addition to the data attributes, data interface components may include chart configuration information that is used to help establish the initial configuration of the chart data visualization. To provide the chart configuration information, the data interface components may be passive code, providing information when requested, or may be dynamic code that changes as a result of interaction with external inputs such as from user interaction with the chart data visualization, the data set, or the chart data visualization engine.

In one implementation, the data interface regions may be configured to act as one-way data transfer portals between data sets and the graphical user interface supporting the data chart visualization. In such a one-way data transfer mode, the data interface regions accept or inherit data and attributes bound to the data interface components for use in generating the data chart visualization. Such a one-way configuration allows the data interface components to act as a data "payloads," delivering data to the data interface regions.

In another implementation, the data interface regions may be configured to act as two-way data transfer portals between data sets and the graphical user interface supporting the data chart visualization. In such a two-way data transfer mode, the data interface regions are used to receive data from the data interface components and update the received data interface components with updates, for example, made through user interaction with the data chart visualization. In this configuration, the data interface component may inherit the changes or are used as code to establish a two-way data link to allow the changes to be stored in a data source such as a database.

Users may utilize the method and system to quickly and efficiently graphically model a chart data visualization using a graphical interface designed to, for example, facilitate a user in interactively changing chart types, data, and attributes in real-time in order to determining the best type of chart visualization for the data set, and the like.

Such a graphical user interface allows a user to use data interface components, data interface regions, metadata, real-time processing, and elements from multiple data sources in order to automate the creation of improved data chart visualizations.

A further understanding of the nature and the advantages of particular embodiments disclosed herein may be realized by reference of the remaining portions of the specification and the attached drawings.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

DETAILED DESCRIPTION OF EMBODIMENTS

In the following description, numerous specific details are set forth to provide a more thorough description of the specific examples described herein. It should be apparent, however, to one skilled in the art, that one or more other examples and/or variations of these examples may be practiced without all the specific details given below. In other instances, well-known features have not been described in detail so as not to obscure the description of the examples herein. For ease of illustration, the same number labels are used in different diagrams to refer to the same items; however, in alternative examples the items may be different.

A system and method for modeling, developing, and maintaining chart data visualizations and associated data sets is described. The system includes a graphical user interface (GUI) designed to facilitate a user in quickly and efficiently modeling and developing chart data visualizations for example by enabling the user to create, bind, update, change, analyze data which is displayed as a data chart visualization. More specifically, the graphical interface is configured to facilitate the user in interactively and dynamically modeling and deploying charting data visualizations which are rendered as data charts (hereinafter "data chart" or "data charts") by enabling the user to graphically model and present data as data charts pertaining to businesses and enterprise organizations, as well as present data charts for other areas such as engineering, scientific research, finance, education, and the like.

Data, as described herein, may include any type of data used to reflect information using charts or graph visualizations. For example, such data may be related to the sales figures for employees of a business. The data when portrayed graphically, may show graphic patterns that may be used by users in order to detect patterns in the data by graphically displaying a set of coordinates on a display illustrating trends, anomalies, relationships, and the like, in the data being displayed.

The method and system further include using a graphical modeling software engine, user graphical interface, and associated analysis tools to receive, model, create, configure, analyze, display, and deploy a data chart for user graphical manipulation thereof.

Figure 1:
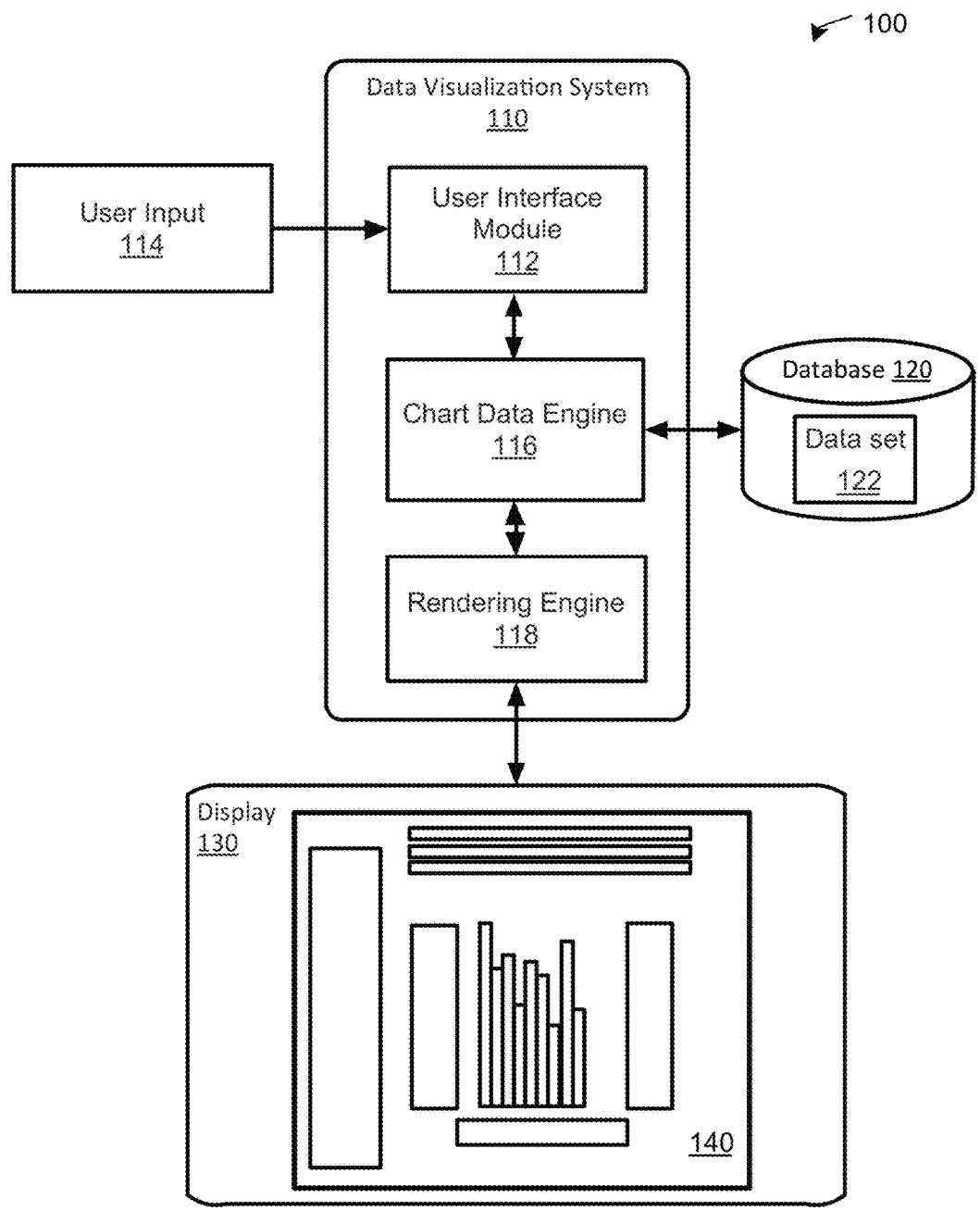
FIG. 1 is a high-level block diagram of an exemplary computing system and graphical user interface used for creating, modifying, and displaying chart data visualizations.

FIG. 1 is a high-level block diagram of an exemplary computing system 100 for graphical modeling, creating, maintaining, and analyzing data chart visualizations. Computing system 100 may be any computing system, such as an enterprise computing environment, client-server system, and the like. Computing system 100 includes data visualization system 110 configured to process data received from a user interface 114, such as a keyboard, mouse, etc., with regard to modeling, data binding, maintenance, and analysis of data chart 140, and associated data, data elements, and information as described herein.

Note that the computing system 100 presents a particular example implementation, where computer code for implementing embodiments may be implemented, at least in part, on a server. However, embodiments are not limited thereto. For example, a client-side software application may implement data visualization system 110, or portions thereof, in accordance with the present teachings without requiring communications between the client-side software application and a server.

In one exemplary implementation, data visualization system 110 is connected to display 130 configured to display data chart 140, for example, to a user thereof. Display 130 may be a passive or an active display, adapted to allow a user to view and interact with graphical data chart 140 displayed thereon, via user interface 114. In other configurations, display 130 may be a touch screen display responsive to touches, gestures, swipes, and the like for use in interacting with and manipulating data chart 140 by a user thereof. Gestures may include single gestures, multi-touch gestures, and other combinations of gestures and user inputs adapted to allow a user to model, generate, deploy, and maintain data chart 140.

In other implementations, computing system 100 may include a data source such as database 120. Database 120 may be connected to the data visualization system 110 directly or indirectly, for example via a network connection, and may be implemented as a non-transitory data structure stored on a local memory device, such as a hard drive, Solid State Drive (SSD), flash memory, and the like, or may be stored as a part of a Cloud network, as further described herein.

Database 120 may contain data sets 122. Data sets 122 may include data as described here to be graphed and charted. Data sets 122 may also include data pertaining to data attributes, data hierarchy, nodal positions, values, summations, types of charts of visualizations, algorithms, code (e.g., Javascript, Javascript Object Notation (JSON)), source, security, hashes, and the like. In addition, data sets 122 may also contain other data, data elements, and information such as metadata, labels, development-time information, run-time information, data-binding configuration information, API, interface component information, library information, pointers, and the like.

Data visualization system 110 may include user interface module 112, chart data engine 116, and rendering engine 118. User interface module 112 may be configured to receive and process data signals and information received from user interface 114. For example, user interface module 112 may be adapted to receive and process data from user input associated with modeling, deploying, maintaining, and graphically updating data chart 140 for processing via data visualization system 110.

In an exemplary implementation, chart data engine 116 may be adapted to receive data from user interface 114 and/or database 120 for processing thereof. In one configuration, chart data engine 116 is a software engine configured to receive and process input data from a user thereof pertaining to data chart 140 from user interface module 114 and/or database 120 in order to generate, bind, graphically model, maintain, analyze, and embellish data chart 140.

Chart data engine 116 in other implementations may be configured as a data analysis tool to perform analysis functions, data binding functions, and transformations to data sets associated with data chart 140. Such analysis functions may include determining the attributes associated with the data, determining the type of data being charted, determining the values of the data, determining the relationships to other data, interpreting metadata associated with the data, and the like. For example, chart data engine 116 may be configured to receive and analyze data sets 122 to determine user interface configuration, data processing instructions, data attributes, data hierarchy, nodes, nodal positions within the hierarchy, values, summations, types of chart visualizations, algorithms, source, security, hashes, and the like, associated with data sets 122.

Moreover, chart data engine 116 may be used to perform chart transformations such as transforming the data set into a data table having a plurality of rows and columns forming a plurality of data series which are then visually represented as a base data chart (origin chart) which then may be viewed or transformed into a plurality of chart types such as bar charts (column chart), multiple bar charts, pie charts, bubble charts, funnel charts, line charts, radar/polar charts, and the like.

Chart data engine 116 may receive existing data sets 122 from database 120 for processing thereof. Such data sets 122 may include and represent a composite of separate data sets 122 and data elements pertaining to, for example, organizational data, which may include employment data, salary data, personnel data, and the like, associated with data chart 140. In addition, data sets 122 may include other types of data, data elements, and information suitable for displaying as data chart 140 such as sales data, production data, scientific data, financial data, medical data, census data, and the like.

Rendering engine 118 may be configured to receive configuration data pertaining to data chart 140, associated data sets 122, and other data associated with data chart 140 such as user interface components, icons, user pointing device signals, and the like, used to render data chart 140 on display 130. In one exemplary implementation, rendering engine 118 may be configured render 2D and 3D graphical models and simulations to allow a user to obtain more information about data sets 122 bound to data chart 140. In one implementation, upon receiving instruction from a user, for example, through user interface 114, rendering engine 118 may be configured to generate a real-time display of interactive changes being made to data chart 140 by a user thereof.

FIGS. 2A-G are exemplary block diagrams of graphical user interface 200 used for graphical modeling, development, deployment, display, and maintenance of charting data visualizations, such as data chart 140, displayed as a graphical visualization in various states of modeling and updating. Such data chart 140 may be the result of model creation or manipulation of existing data sets 122, data elements, and information received from, for example, database 120.

Figure 2A:
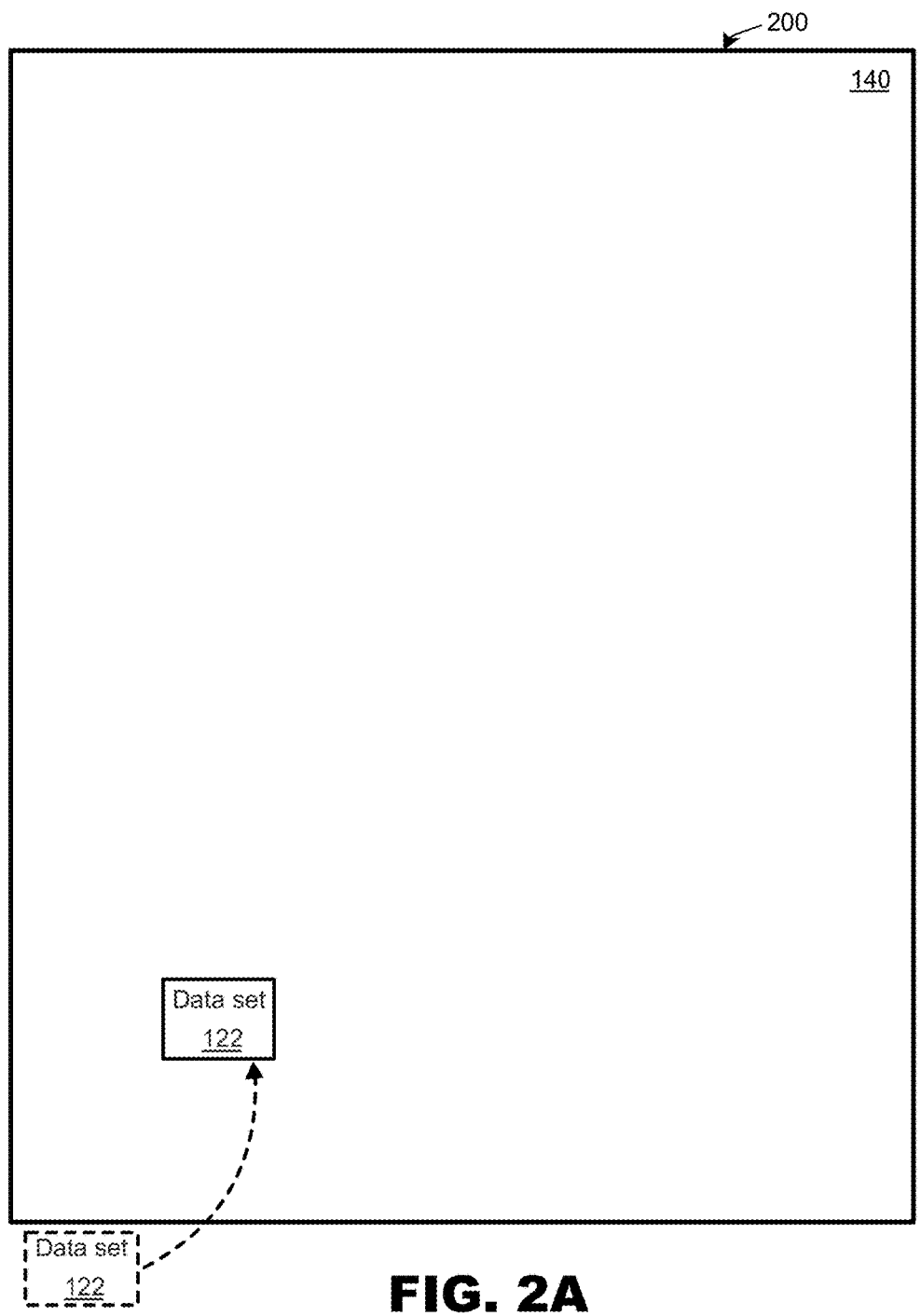
FIG. 2A is a high-level block diagram of an exemplary user interface used for graphical development and maintenance of a data chart graphical visualization in a first development state.
Figure 2B:
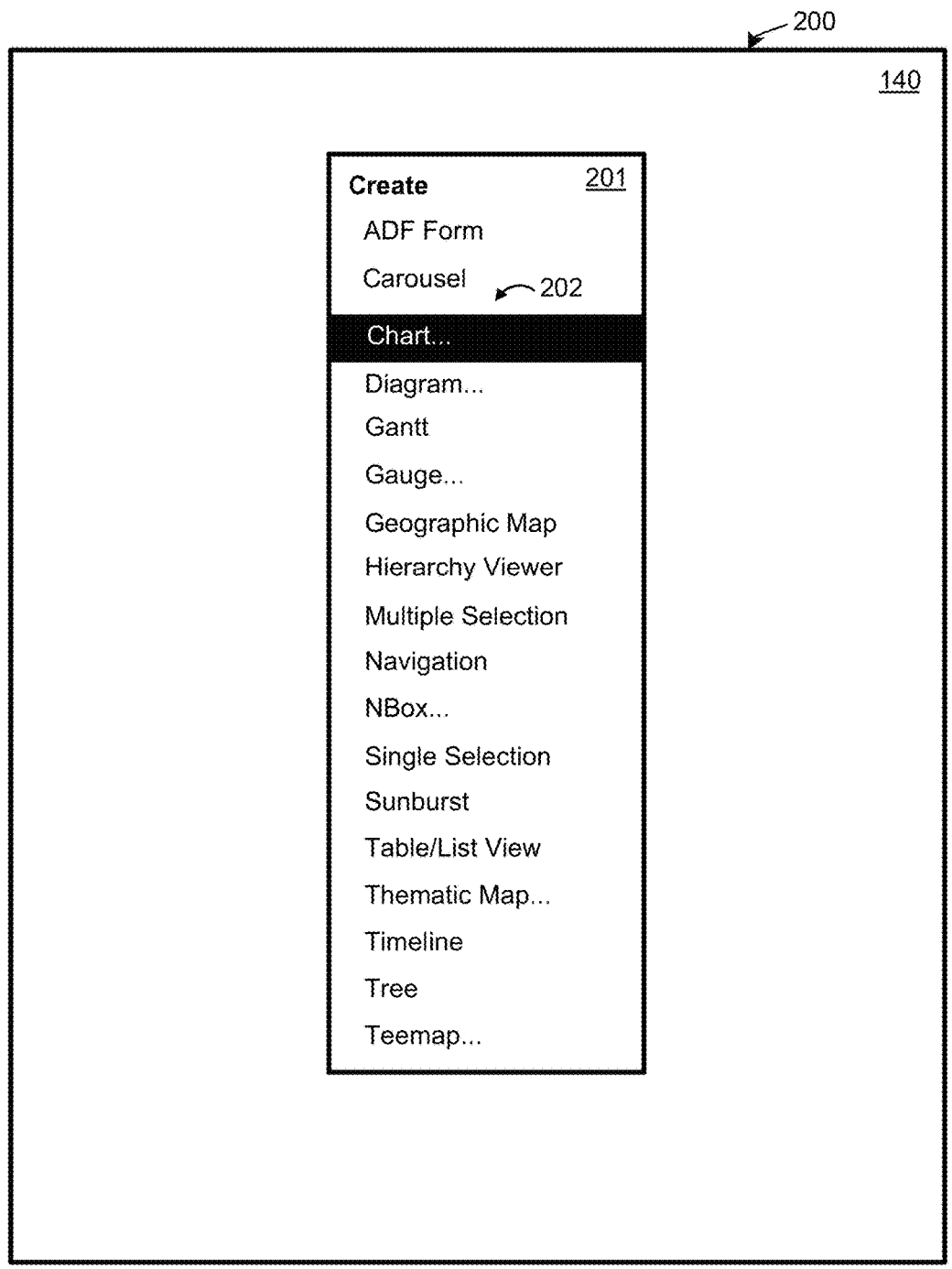
FIG. 2B is a high-level block diagram of an exemplary graphical user interface used for graphical development and maintenance of a data chart graphical visualization in a second development state.
Figure 2C:
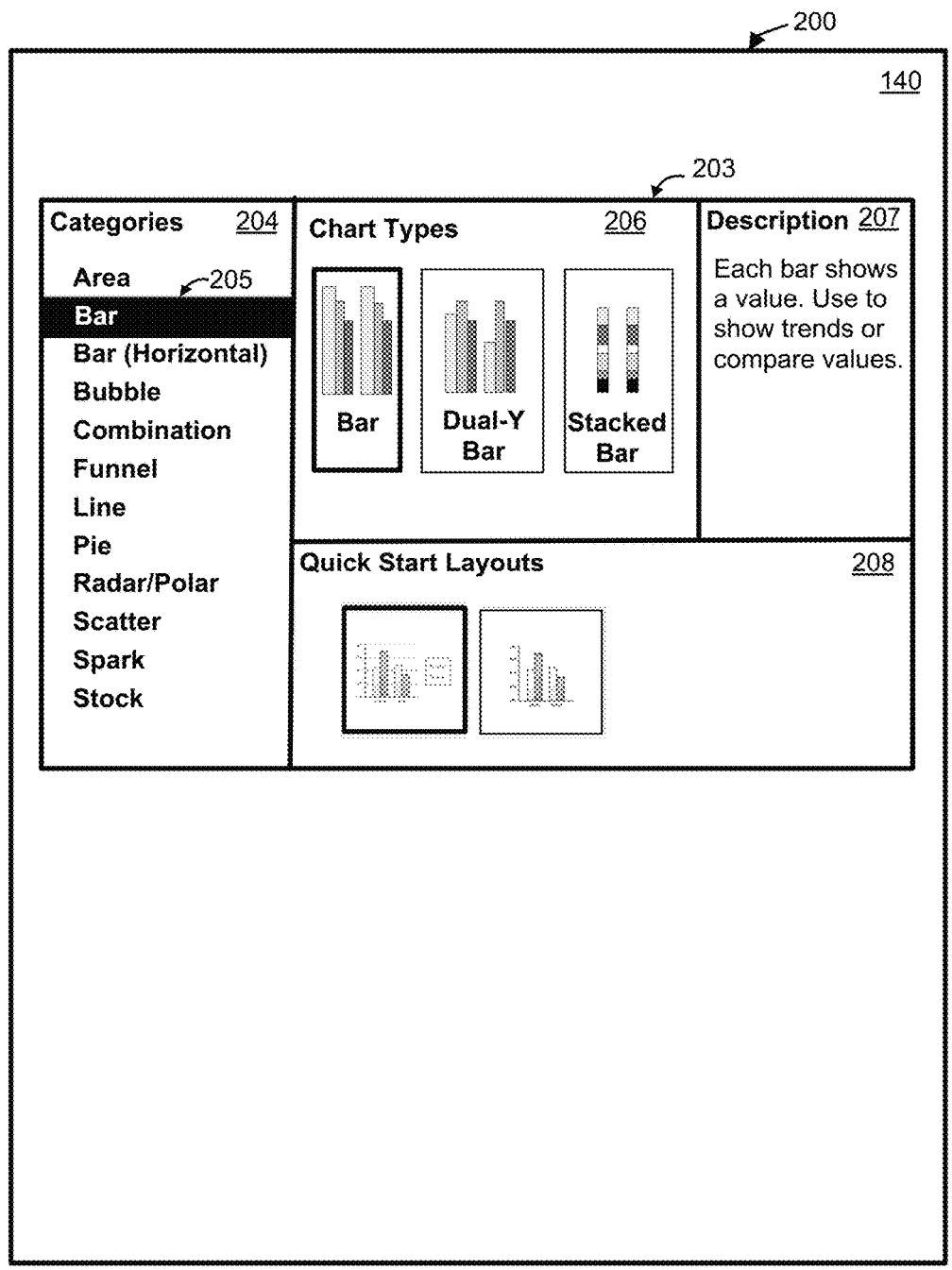
FIG. 2C is a high-level block diagram of an exemplary graphical user interface used for graphical development and maintenance of a data chart graphical visualization in a third development state.

FIGS. 2A, 2B, and 2C are illustrations of data chart 140 in a first state, second state, and third state, respectively. Graphical user interface 200 may be configured to receive one or more data sets 122 therein for deployment of data chart 140. In one implementation, data set 122 is selected and placed into a graphical area of graphical interface 200. Data set 122 may be selected from database 120 as a graphical data abstraction using a mouse, pointing device, gesture, and/or input from a user interacting with user interface 114. For example, a user may "drag-and-drop" data set 122 into a display region of graphical user interface 200.

In one exemplary implementation, as illustrated in FIG. 2B, in response to receiving data set 122, graphical user interface 200 may generate data chart menu 201. Data chart menu 201 may be configured to provide a user with a plurality of view components 202 for binding with one or more data sets 122 thereto. For example, view components such as Application Development Framework (ADF) forms, carousel views, charts, directed graphs, and the like, may be displayed in data chart menu 201 for selection by a user to bind with data set 122.

Referring to FIG. 2C, upon selection of a view component 202, such as "Chart . . . " from data chart menu 201, a view component selection display 203 is displayed. View component selection display 203 may include a display of categories 204, type display 206 showing types of view components 202 available for selection, description 207 providing information about a selected type of view component 202, and a "Quick Start Layout" display 208. For example, as illustrated in FIG. 2C, a "Bar" category 205 is selected referring to bar charts, such as "Bar," "Dual-Y Bar", "Stacked Bar," and the like, illustrated in type display 206.

Figure 2D:
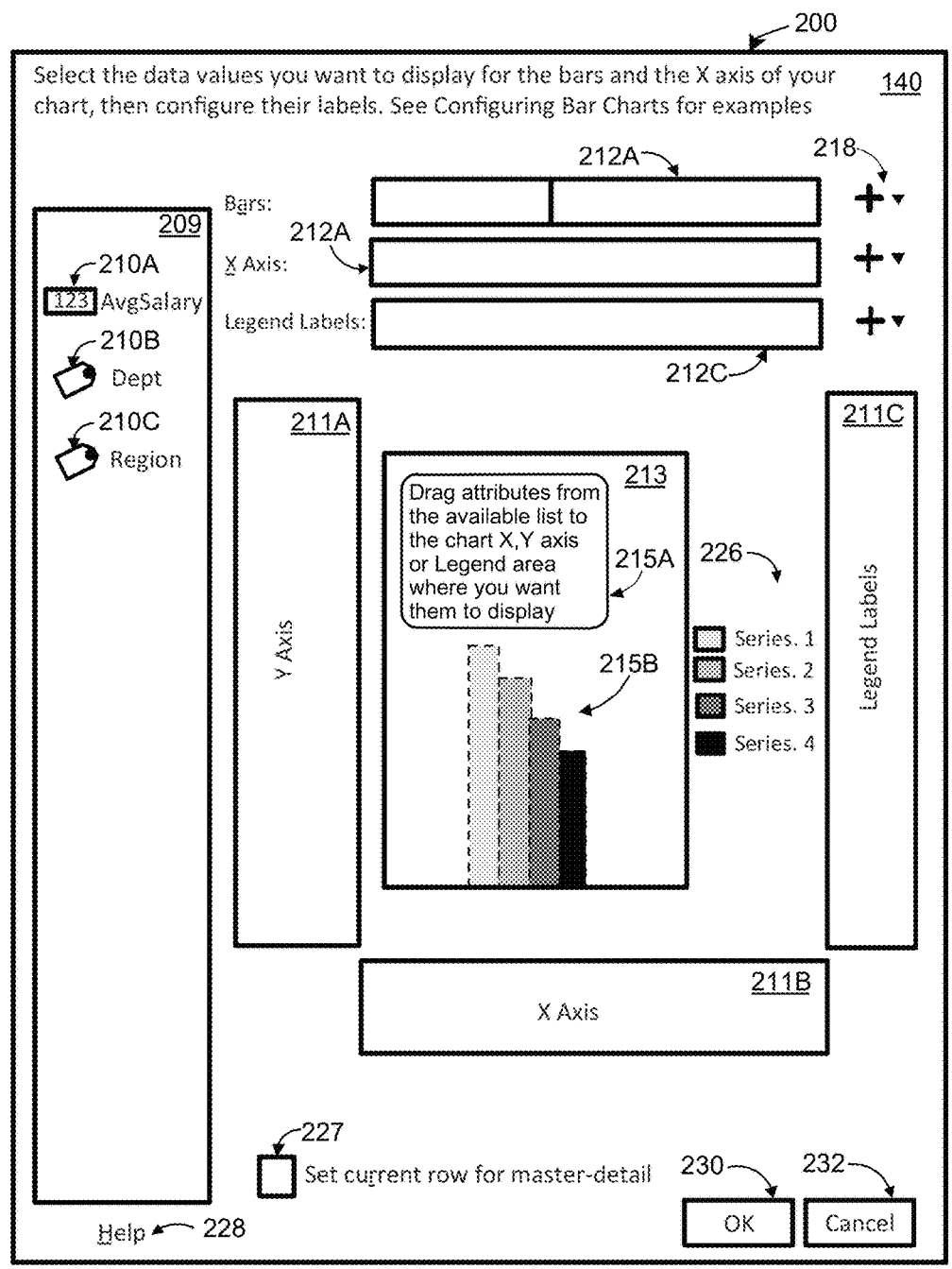
FIG. 2D is a high-level block diagram of an exemplary graphical user interface used for graphical development and maintenance of a data chart graphical visualization in a fourth development state.

FIG. 2D is an illustration of data chart 140 in a fourth state. Once a view component 202 is selected, graphical user interface 200 may be configured to include data list display region 209, data interface regions 211, such as data interface regions 211A, data interface region 211B, data interface region 211C, and data editing region 212A and data editing region 212B, disposed about graphical display area 213. As described herein, data list display region 209 is configured to provide data interface components 210, also referred to as "chart tags," that may be connected to one or more data sets 122, data elements, or other data sources associated with data chart 140. Such data interface components 210 may be considered graphical representations of data attributes for an associated data set 122, as described further herein. Such data sets 122, data interface component 210, and data chart 140 may be reflected as an instance of data chart 140 and stored for example, in database 120.

In one implementation, to aid a user in determining a data visualization of data chart 140, information such as text information 215A and graphical information 215B may be displayed, for example, in graphical display area 213. In addition, representative proxy icons, such as legend labels 226, may be used in combination with text information 215A and/or graphical information 215B to generate an example visual layout of data chart 140 prior to processing data interface components 210, thereby providing a visual guide to users thereof.

In addition, graphical user interface 200 may contain other tools, features and functions designed to assist the user in designing, modeling, and deploying data visualizations such as data chart 140. For example, as illustrated in FIGS. 2D-G, graphical user interface 200 includes check box 227 to set the current row of data in a data set to a master-detail set, "help" function 228 configured to provide instructions to a user, "OK" button 230 used to set the configuration of a particular data chart 140 or provided a confirmation instruction to a process, and "Cancel" button 232 configured to cancel processes such as a user actions, current operations, processes, or functions.

Data list display region 209 in one implementation contains data in the form of interface components bound to data such as data sets 122. For example, as illustrated in FIGS. 2D-G, data list display region 209 contains data interface component 210A "AvgSalary," bound to data regarding the average salary of employees, data interface component 210B "Dept," bound to data regarding departments of the business, and data interface component 210C "Region," bound to data regarding regional information concerning the business. Such data interface components 210 may represent attributes pertaining to values to be graphed as well as other data such as interface configuration data, metadata, application flow data, and the like, along with code or instructions for processing such interface components when modeling, managing, or deploying data chart 140.

In an exemplar implementation, data interface regions 211, are considered "smart display regions," "hotspots," "fields", "graphical interfaces," or "windows," configured to receive, detect, interpret, analyze, and process data interface components 210 received therein. In addition, such data interface regions 211 such as 211A, 211B, and 211C, may be implemented either as user interface of a stand alone application, as an application coupled to, and interactive with, chart data engine 116, and/or as part of an application flow layer having an Application Program Interface (API) configured to receive, process, and bind data received therein.

In an exemplary implementation, placement of data interface component 210A into data interface region 211A from data list display region 209 initiates a process whereby attributes and data associated with data interface region 211A are processed, for example by software associated with data interface region 211A to generate graphical data such as graph coordinates, e.g., X-coordinate, Y-coordinate, Z-coordinate, etc. to plot the data set 122 being displayed.

Figure 2E:
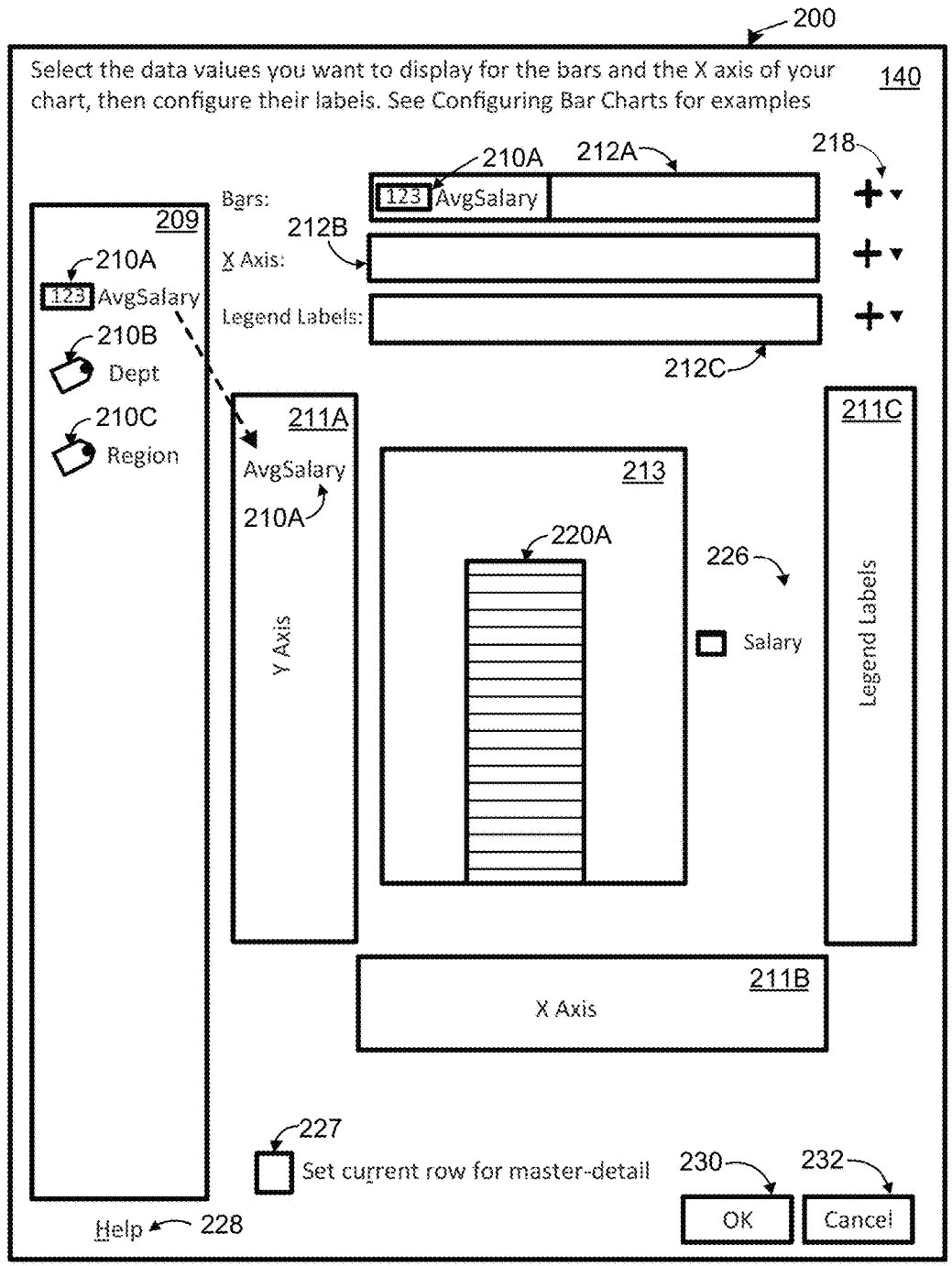
FIG. 2E is a high-level block diagram of an exemplary graphical user interface used for graphical development and maintenance of a data chart graphical visualization in a fifth development state.

As illustrated in FIG. 2E, representing a fifth state of data chart 140, a user may select and use a drag-and-drop motion to select and move a data interface component 210 to a data interface region 211. For example, "AvgSalary" data interface component 210A may be selected and moved from data list display region 209 to data interface display region 211A. Once the data interface component 210A has been placed into or associated with data interface region 211, such as data interface region 211A, a software application coupled to data interface region 211, such as chart data engine 116, may process such data in order to generate the Y-Axis coordinates of the associated data set 122. Since "AvgSalary" represents a single set of data related to average salary, such data set 122 pertaining to "AvgSalary" attribute may then be rendered as a one-dimensional bar grouping 220 of "one bar" as illustrated in graphical display area 213.

Similarly, data interface components 210 placed in data interface regions 211B, which, in this example, is associated with the X-Axis of graphical display area 213, initiate a process whereby a software application coupled to data interface region 211B, such as chart data engine 116, may process such data in order to generate the X coordinates of the associated data set 122 as described further herein.

Moreover, data interface components 210 placed in data interface regions 211C, which, in this example, is associated with the legend labels 226 of graphical display area 213, initiate a process whereby a software application coupled to data interface region 211C, such as chart data engine 116, may process such data in order to generate legend labels 226 of the associated data set 122 as described further herein for display to a user on data chart 140.

Some data interface regions 211 may be used to process other aspects of data chart 140. Such other aspects may include data chart configuration information such as labels, colors, patterns, types, coordinate placement, 2D values, 3D values, and the like. For example, in an exemplary implementation, data interface components 210 placed in data interface regions 211C, which, in this example, in addition to data labels, may be associated with colors, patterns, types, coordinate placement, 2D values, 3D values, and the like, used in rendering data chart 140 in graphical display area 213.

Data interface regions 211 may be configured to operate as one-way or two-way data interfaces. In one implementation, configured as a one-way data interface, data interface regions 211, such as data interface regions 211A-C, may be configured to receive, parse, and process data attributes and data sets 122 associated with data interface component 210 received therein through interaction with an application such as chart data engine 116, in order to render data chart 140.

Alternatively, configured as a two-way data interface, data interface regions 211, such as data interface regions 211A-C, may be configured to receive, parse, and process data attributes and data sets 122 associated with data interface component 210 received therein through interaction with an application such as chart data engine 116 in order to render data chart 140, and additionally transmit data from the graphical user interface 200 related to interaction with data chart 140 to chart data engine 116, database 120, or other external applications associated with data visualization system 110. For example, once data and data attributes associated with "AvgSalary" data interface component 210A have been received and processed, changes to the attributes associated with the configuration of and interaction with data chart 140, such changes may be inherited by data interface component 210A, or stored with a data structure, metadata, and/or data set associated with the "AvgSalary" data interface component 210A.

Thus, configuring data interface regions 211 in a two-way data interface mode, provides a user with the ability to receive, process, and deploy an initial data set 122 from an initial version of data chart 140, and then store changes the user has made to data chart 140 via the data binding connection formed between the data interface component 210A and associated data set 122.

In an exemplary implementation, placement of data interface components 210 into data interface regions 211 automatically places data interface components 210 into an associated X-Axis or Y-Axis data editing region 212, such as data editing regions 212A, 212B, and 212C. Such data editing regions 212 as described herein provide the user direct editing access to attributes, data, and information associated with data interface components 211 placed in data editing regions 212.

For example, in one implementation, data editing regions 212 in conjunction with chart data engine 116 may be configured to provide the user with tools to perform data graphing functions such as setting or modifying chart values, editing or adding attributes, selecting a type of chart to visualize the data, setting graphing coloration schemes, setting chart layout schemes, setting axis values such, e.g., logarithmic, linear, set the scale of the graph, and the like.

Moreover, such data editing regions 212 may be used to allow a user direct access to manipulate and interact with data chart 140 through user interface 114 in lieu of dragging-and dropping data interface components 210 into data interface regions 211. Thus, a user having non-graphical manipulation access to data chart 140 may be able to use interface 114 to deploy, create, edit, update, and maintain data chart 140 without relying on graphical interactions with graphical user interface 200, for example requiring the use of a mouse, touch screen, etc.

Direct editing access using data editing regions 212 may include updating data and data attributes directly through user interface 114, editing graphical configuration information such as a color or patterns used to display the data on data chart 140, adding values, deleting values, adding attribute, deleting attributes, and the like, and may include binding a process to the data such as a data filter or other process that may be used when rendering such data in data chart 140. For example, a process may include a filtering algorithm used to filter values within a specified range.

In an implementation, a user may directly access and manipulate and edit underlying data and attributes using graphical commands and actions, for example, by opening an editing window or other user interface portal and/or receiving user input through user interface 114. Thus, while the data interface components 210 may be bound to attributes and other associated data used to form data chart 140, data editing regions 212 may be used to edit and modify such bound data directly through graphical interaction and/or through user input via user interface 114.

In one exemplar implementation, data editing regions 212 properties may be extended using editing functions 218. Editing functions 218 may allow a user access to additional editing and data chart configuration operations using drop down menus, checkboxes, gestures, and the like. Editing functions 218 may allow the user to extend the visual region of data editing regions 212, add or subtract additional data representations to the data chart 140, and the like. For example, a user may want to combine multiple separate data sets to produce a Y-Axis data set by placing more data interface components 210 than may be visually accommodated by a single data editing region 212. To accommodate the additional data interface components 210, using editing functions 218, data editing regions 212 may be configured to expand vertically to provide more graphical space.

In another exemplary implementation, editing functions 218 may be used to add additional axis information. For example, a first data editing region 212 may be set to support an axis value displayed in "Dollars," whereas a second data editing region 212 may simultaneous allow the user to display the same axis values as "Euros," etc. Thus, in this example, the user would be able to display two or more different values for the data set being presented along, for example, the same X-axis or Y-axis.

In one exemplary implementation, the graphical position and placement of data interface components 210 within data list display region 209 and/or data interface regions 211 may be used to establish a data hierarchy and corresponding data structure which may be utilized for configuring data chart 140. For example, graphically placing data interface component 210A above data interface component 210B as illustrated may be used to indicate a hierarchy precedence of data interface component 210A over data interface component 210B, such that when displayed, data interface component 210A may be displayed more prominently than data interface component 210B.

Figure 2F:
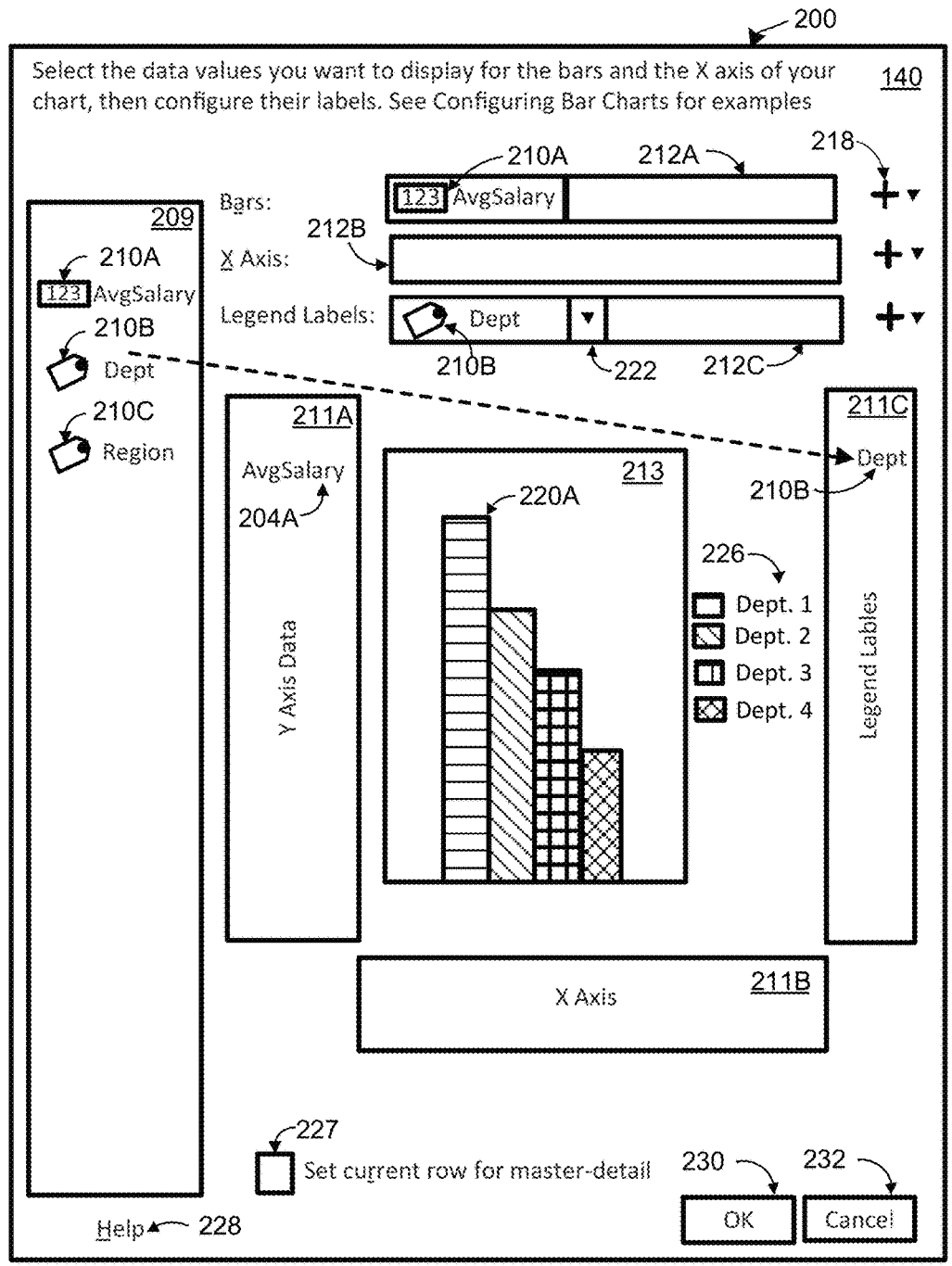
FIG. 2F is a high-level block diagram of an exemplary graphical user interface used for graphical development and maintenance of a data chart graphical visualization in a sixth development state.

FIG. 2F is an illustration of data chart 140 in a sixth state. In this illustration, data interface component 210B, "Dept," has been selected from data list display region 209 and disposed, e.g., "dragged and dropped," into data interface region 211C, "Legend Labels," used to generate data labels for data displayed in data chart 140. In this illustration, bar grouping 220A is shown which is being used to present attributes of data set 122 associated with a label of "Dept." Once disposed into data interface region 211C, a process coupled to data interface region 211C, such as chart data engine 116, may be initiated to process such data set 122 in order to generate legend labels 236 for data chart 140 associated with data set 122 as described further herein.

Data editing region 212C may include dropdown function 222 that allows a user to manipulate data interface components 210 listed in data editing region 212C. In one implementation, drop down function 222 may provide a user the ability to perform functions on data interface component 210, such as treating the data interface components 210 disposed in data interface region 212C as text, moving interface components 210 left or right relative to each other in order to change the label ordering, deleting interface components 210, etc. For example, as shown data editing region 212C includes data interface component 210B with a current label shown of "Dept." Dropdown function 222 may be configured to allow data interface component 210B to be treated as text, moved left or right relative to other data interface components 210 disposed adjacent thereto, or delete data interface component 210B from data editing region 212C.

In one functional example, data interface component 210C labeled "Dept.," is bound to data set 122 containing data and attributes associated with four departments, e.g., accounting, legal, production, sales, etc., being graphed, e.g., "Dept. 1," "Dept. 2," "Dept. 3," and "Dept. 4." In this example, each of the departments one through four is shown as individual bars of a bar grouping 220 of data chart 140. The individual bars of bar grouping 220 are each given a different attribute such as a different fill or color to differentiate the bars of bar grouping 220. The heights of the individual bars of bar grouping 220A represent magnitude values along the Y-Axis associated with "AvgSalary" values for departments one through four.

In this example, since the Y-Axis data interface regions contains data interface component 210A, "AvgSalary," the magnitude for each of the bars would be the relative values of each departments one through four. For example, department one, has a greater magnitude than department two, which has a greater magnitude than department three, which has a greater magnitude than department four. In this illustration, since there is no X-Axis data, bar grouping 220 may be placed in a default location along the X-Axis without any X-Value information indicating that the current data chart 140 is one-dimensional.

Legend labels 226 are presented adjacent to graphical display area 213 to provide a user with visual label information pertaining to each of the bars of bar grouping 220A. The individual bars of bar grouping 220A may each given a different attribute such as a different fill or color to differentiate the bars of bar grouping 220A from one another. A user viewing bar grouping 220A will be shown information that will associate each bar with a particular portion of data set 122. For example, label "Dept. 1" may be associated with a first bar, label "Dept. 2" may be associated with a second bar, label "Dept. 3" may be associated with a third bar, and label "Dept. 4" may be associated with a fourth bar of bar grouping 220A.

The visual placement of each label may be set to in an orderly fashion such as the left most bar of bar grouping 220A, i.e. "Dept. 1" is placed as shown as the top most label of labels 226, the second left most bar, i.e., "Dept. 2", is the next label as shown below the label for "Dept. 1," and so on, or may be placed in some value order indication where, for example, the highest magnitude values, such as "Dept. 1", would start at the top most position of legend labels 226 as shown, the next highest magnitude bar, such as "Dept. 2," would be have its label placed below the highest label as shown, and so fourth. However, it is contemplated that the visual placement could be in virtually any arrangement used to advantage.

Figure 2G:
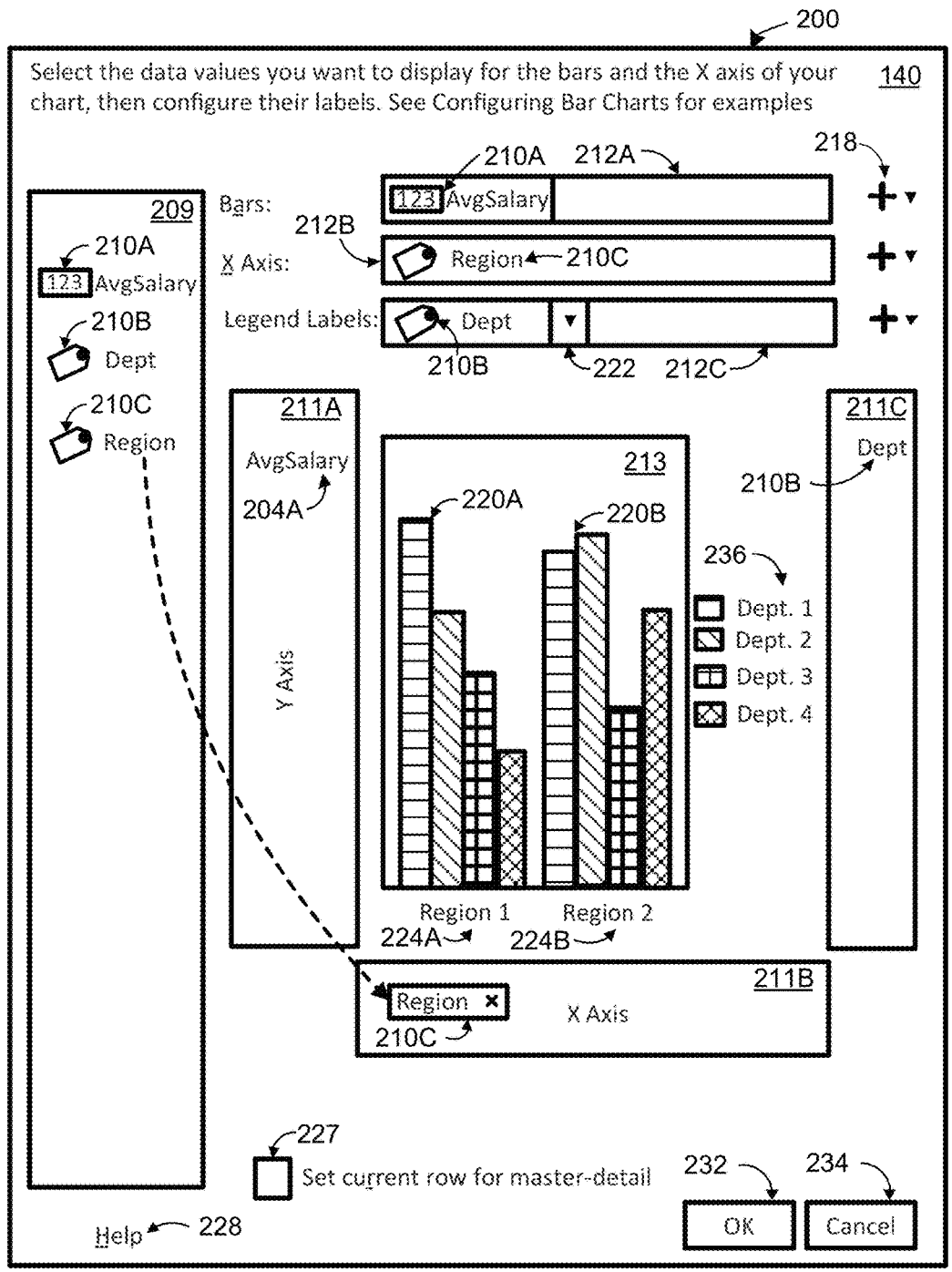
FIG. 2G is a high-level block diagram of an exemplary graphical user interface used for graphical development and maintenance of a data chart graphical visualization in a seventh development state.

FIG. 2G is an illustration of data chart 140 in a seventh state. In this illustration, data interface component 210C, "Region," has been selected from data list display region 209 and placed, e.g., "dragged-and-dropped," into data interface region 211B, "X-Axis," used to plot the X-Axis coordinates for data set 122 displayed in data chart 140. In this illustration, data interface component 210C illustratively refers to data pertaining to geographic locations of a business stored in data set 122 being displayed. Data interface component 210C includes data pertaining to two geographic regions, region 224A and 224B, related to data associated with first and second regions, labeled as "Region 1" and "Region 2."

In this illustration, the revised data chart 140 now illustrates bars representing departments one through four associated with "Region 1" and "Region 2." For example, consider the case where "Region 1" is the "Western Region," and "Region 2," is the "Eastern Region," data chart 140 would display the average salary for departments one-through four in the department's "Western Region" and the department's "Eastern Region." By the addition of the X-Axis data, while only a single data point of "region," data chart 140 is transformed from a one-dimensional data chart visualization into a two-dimensional data chart visualization, as now the portion of data set 122 being displayed illustrates the average sales of departments one through four with respect to two geographic regions.

For example, departments bar groupings 220A and 220B may represent departmental data for departments one through four relative to two business regions reflecting total employee average salary's for each department with respect to the two business regions, "Western Region," and "Eastern Region." Such data may be further refined, embellished, and filtered by combining other data sets 122, data elements, information, and attributes listed in data list region, and/or found in other data locations such as database 120.

In an exemplary implementation, revisions to data chart 140, such as changes to the color, placement, legends, made by the user, for example, to bar groupings 220A and/or 220B, may be stored with respective data interface components 210. Such stored configuration and display data may then be used as a template for other data charts 140 using the updated versions of data interface components 210. Alternatively, due to the bound nature of data sets 122 to data interface components 210, such revisions to data chart 140 may be bound to one or more data sets 122, and stored, for example, within database 120 for access thereof.

Figure 3:
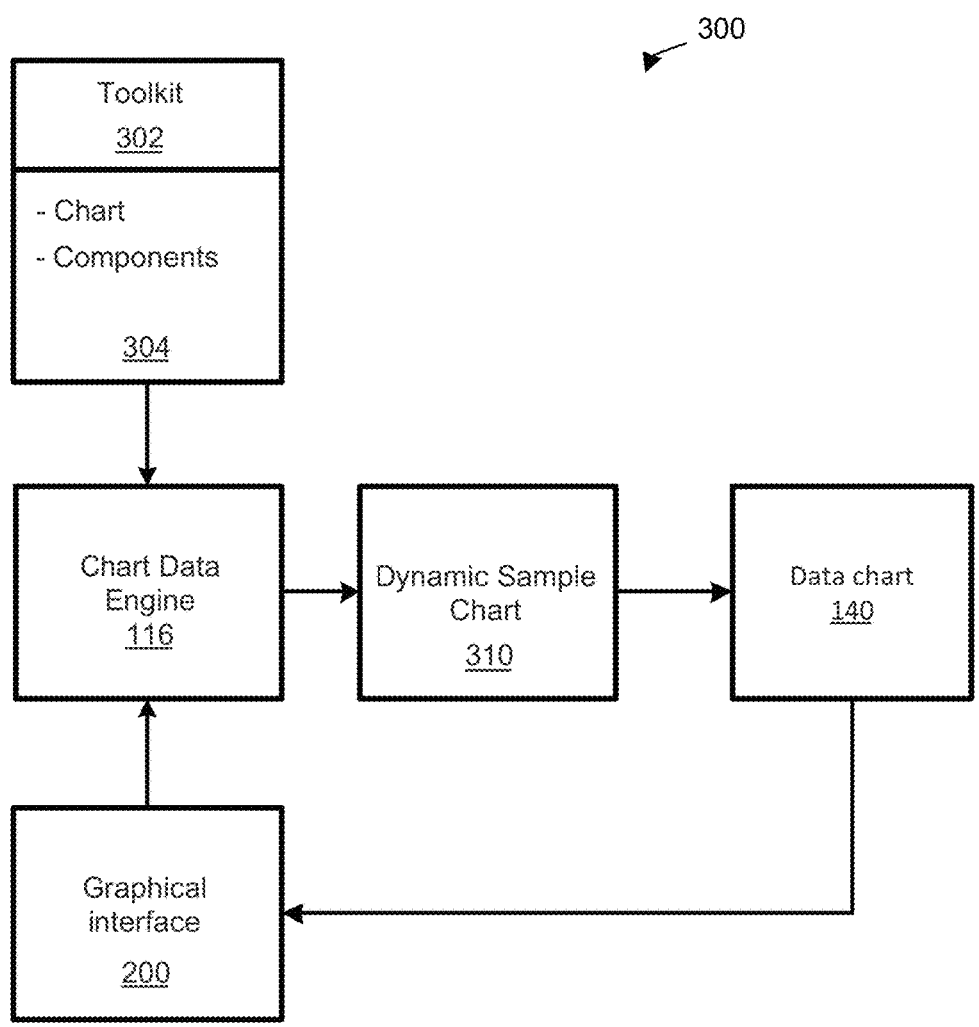
FIG. 3 is a high-level block diagram illustrating a process and process components used in generating chart data visualizations.

FIG. 3 is a block diagram illustrating high-level process 300 used for generating chart data visualizations such as data chart 140. Process 300 includes toolkit 302, charting data 304, and graphical interface 200, configured as a chart design time (DT) user experience interface, connected to chart data engine 116. The output of chart data engine is coupled to dynamic sample chart 310 used for rendering data chart 140. In one exemplar implementation, a user utilizes toolkit 302, such as a JavaScript toolkit, configured to accept and map data attributes to data interface components 210, such as shown in FIGS. 2D-G. In this illustration, a user may use such toolkit 302 to directly manipulate such data interface components 210 through graphical interface 200 in combination with chart data engine 116 to generate a dynamic sample chart 310, which is ultimately rendered as data chart 140 on display 130.

In another implementation, toolkit 302 may be loaded into chart data engine 116, such as a JavaScript running on a JAVA virtual machine such as a NASHORN engine developed by the ORACLE, and cached. A design-time create catalog for a data-bound chart instance in a developer, such as JDEVLOPER by ORACLE, is used to render graphical user interface 200, including data interface regions 211A-C and rendered as dynamic sample chart 310.

In one exemplary implementation, once the dynamic sample chart 310 is rendered as data chart 140, for example though rendering engine 118, a user may dynamically update dynamic sample chart 310 through the use of graphical user interface 200 as described herein. During design time, such dynamic sample chart 310 may be updated in real-time to display a run-time version of a current data-binding configuration.

Advantageously, since chart data engine 116 may be used to generate both design-time versions of data chart 140, as well as run-time versions of data chart 140, there is a high degree of fidelity between the design-time versions and run-time versions of data chart 140.

Figure 4:
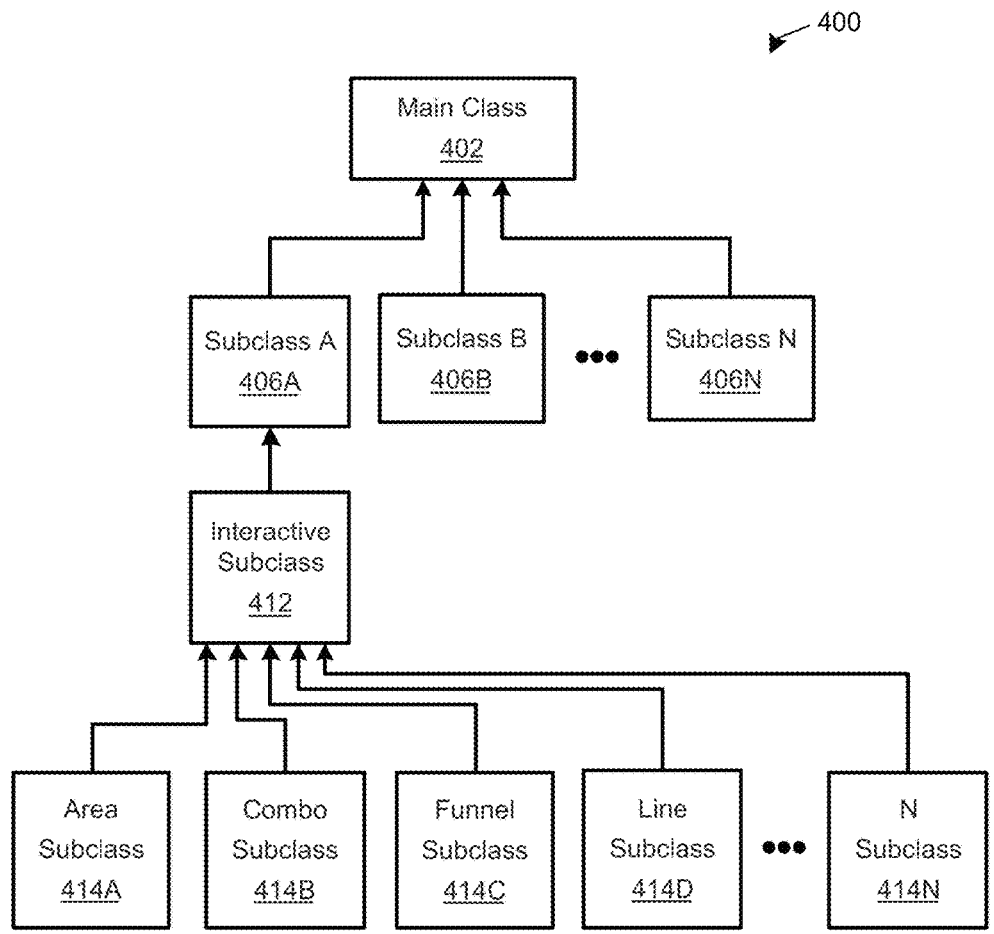
FIG. 4 is a high-level block diagram illustrating a schema used for generating chart data visualizations.

FIG. 4 is a block diagram illustrating a high-level schema 400 used for generating chart data visualizations in conjunction with, for example, applications such as chart data engine 116. Schema 400 represents a high-level software hierarchy of software classes, sub-classes, and interconnections associated with data-binding, processing, configuring, and displaying data sets 122 through graphical user interface 200, for example, as data chart 140, descried herein.

In one exemplar implementation, main class 402 may be an overall software class dedicated to handling drag-and-drop motions, detection and processing of data interface components 210, configuration and placement of components and regions of graphical user interface 200 such as data list display regions 209, data interface regions 211, etc. and may perform other tasks and functions such as painting shapes, tone mapping, image rendering, icons, detecting swipe motions, analyzing data sets 122, filtering, data-exchange, set graph type, generate strings (e.g., JSON strings), generate Scalable Vector Graphics (SVG), render additional overlays using an underlying canvas, providing text, such as instructional text to users, and the like.

Main class 402 may be connected to several subclasses 406A-N, where subclass 406N is represents an "Nth" subclass. Subclasses 406A-N may be used to provide information to main class 402. For example, main class 402 may inherit properties from subclass 406A configured to provide a common interactive chart image for use in generating dynamic sample chart 310, which may be rendered as data chart 140. Similarly, subclasses 406B-40N may be configured with properties to provide other common interactive chart images such as interactive bubble charts, interactive scatter charts, and the like.

Subclasses 406A-N may be further connected to a plurality of subclasses configured with properties providing information about the location, size, and the behavior of interactive shapes associated with data chart 140. For example, subclass 406A may be connected to an interactive subclass 412. Subclass 406A inherit properties from subclass 412 pertaining to a more specific type of chart, such as bar grouping 220A and 220B as illustrated in FIGS. 2B-D.

As further illustrated in FIG. 4, each subclass 412 may be connected to and inherit properties from additional subclasses. Subclass 412 may inherit properties from a plurality of interactive image subclasses 414A-N, where subclass 414N is represents an "Nth" subclass. Each subclass 414A-N may represent a different type of interactive chart type, such as area charts, combo charts, funnel charts, line charts, bar charts, and the like. For example, subclass 414A may represent an interactive "Area" chart which displays graphically quantitative data based on a line chart where the area between axis and line are commonly emphasized with colors, textures, etc., subclass 414B may represent an interactive "Combo" chart which is a data chart visualization that combines the features of the bar chart and the line chart, subclass 414C may represent an interactive "Funnel" chart used to represent stages in a sales process and show the amount of potential revenue for each stage, and subclass 414D may represent an interactive line chart displaying information as a series of data points (e.g. markers) connected by straight line segments.

Advantageously, such main classes 402 and subclasses 406, 412, and 414 may be combined in virtually any combination to provide information and properties pertaining to interactively rendering data chart 140 in a manner that provides the user with a real-time experience allowing the user to use, for example, drag-and-drop data interface components 210, render additional overlays through calls to the underlying image subclass, set colors and themes, set interactive shape behaviors specific for a given chart type, map data attributes and information to elements of a data chart 140, etc., and provide the user with different ways to visualize data sets 122 that best fits the user's needs.

Figure 5:
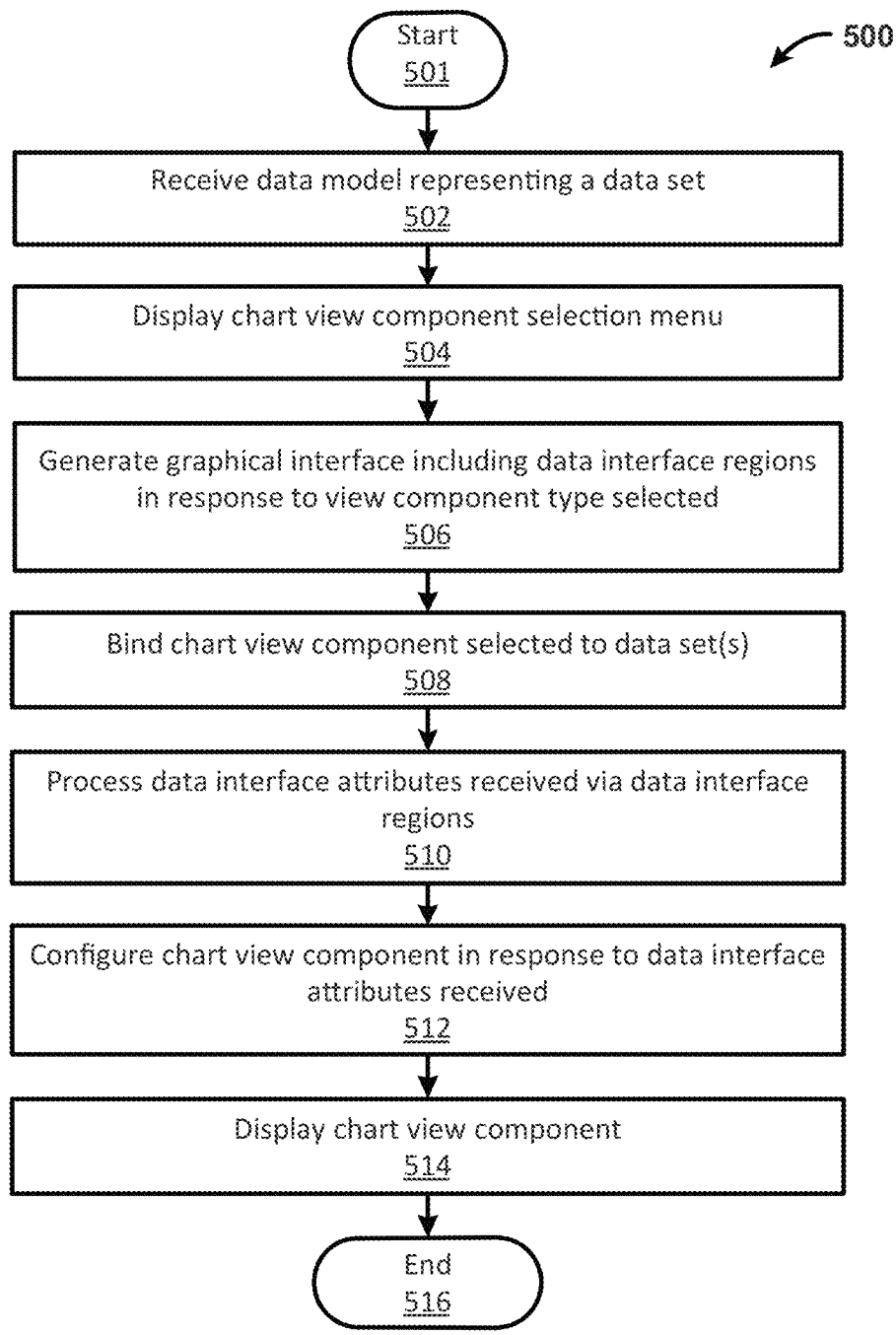
FIG. 5 is a flow diagram of an example method adapted for use with implementations, and variations thereof, illustrated in FIGS. 1-4.

FIG. 5 is a flow diagram of an example method 500 adapted for use with implementations, and variations thereof, illustrated in FIGS. 1-4. Method 500 may be entered into at 501, for example, by a user activating computing system 100 in order to model, edit, manage, analyze, generate a dynamic sample chart 310, and render data chart 140. At 502 data pertaining to one or more data charts, such as data chart 140, is received. For example, a user may instruct computing system 100 select a data model representing a data set 122 to initiate a process to load data set 122 and associated attributes for use in rendering data chart 140.

In this example, method 500 may utilize software such as chart data engine 116 to generate a table of rows and columns from portions of data set 122 for graphing. In addition, method 500 may analyze associated attributes in order to determine a chart type, chart color, axis values, pixel values, data value coordinates, set display regions such as data interface regions 211, data list display region 209, create data interface components 210, layout display area 213, and the like.

At 504, method 500 may determine from the data set 122 which data chart view components 202 are available for selection. In one implementation, as illustrated in FIG. 2B, data chart menu 201 displays view components 202 for selection. Method 500 may analyze data set 122 and associated attributes received in order to determine which view components 202 to display, such as bar charts, line charts, etc.

At 506, method 500 may select one or more view components 202 to use with the particular data chart visualization by, for example, querying the received data for available charts to use for the visualization. As described herein, such charts may include any number of different types of charts used to advantage. For example, as illustrated in FIGS. 2A-2G, data chart 140 includes data and attributes associated with data set 122.

In addition, view component types may be set as a default and stored with data, and/or may be determined from data associated with one or more data sources. In an example, sales data by department may be contained in one data source, and region in another data location. In addition, method 500 may be configured to interpret the data sources and determine since the data sources are related to sales, a "Funnel" chart would be the best starting chart given such a chart is used to display different stages of a sales process.

In response to a type of view component 202 selected, method 500 generates a graphical interface for the view component 202. For example, as illustrated in FIGS. 2D-G, method 500 generates and configures graphical user interface 200 for data chart 140 as discussed supra, including data list display region 209, data interface regions 211A, data editing regions 212, graphical display area 213, etc.

At 508, method 500 determines and binds data interface components associated with the data set(s) loaded. For example, as illustrated in FIGS. 2A-G, data interface components 210A-C are bound to data set 122. As discussed above, the binding process may be configured to provide a one-way binding or a two-way binding. For one-way binding, data interface components 210 are bound to data for use with a particular data chart 140. For two-way binding, data interface components 210 are bound with data received and also bind other aspects of the data chart visualization to the data set 122, such as a data chart configuration data set stored for example in another data storage location such as in memory.

At 510, method 500 process data interface attributes received via data interface regions 211 and creates a chart binding dialog which includes creating the format of the chart and initiating a process to create and render a particular chart chosen for use in the chart data visualization. For example, as illustrated in FIGS. 1, 2A-2G and 3, method 500 may invoke the use of chart data engine 116, toolkit 302 and graphical interface 200 in order to generate dynamic sample chart 310, which is used to model data chart 140.

At 512, method 500 configures a chart view component 202 in response to data interface components received or associated with data set 122. Such data interface components processed by method 500 configure data chart 140 with respect to the type and value of data interface components, as well as the placement of data interface component into data interface regions 211. For example, as illustrated in FIGS. 2D-G, data interface components 210A-C are associated with attributes related to salary, regions, and departments representing Y-Axis, X-Axis, and legend values of data chart 140.

At 514, the data chart is rendered. For example, as illustrated in FIGS. 1, 2A-2G and 3, method 500 may invoke the use of chart engine 116, toolkit 302, rendering engine 118, and chart graphical interface 200 in order to generate dynamic sample chart 310, which is rendered as data chart 140.

Once the data chart visualization, e.g., dynamic sample chart 310 or data chart 140 is rendered, method 500 ends at 516.

Figure 6:
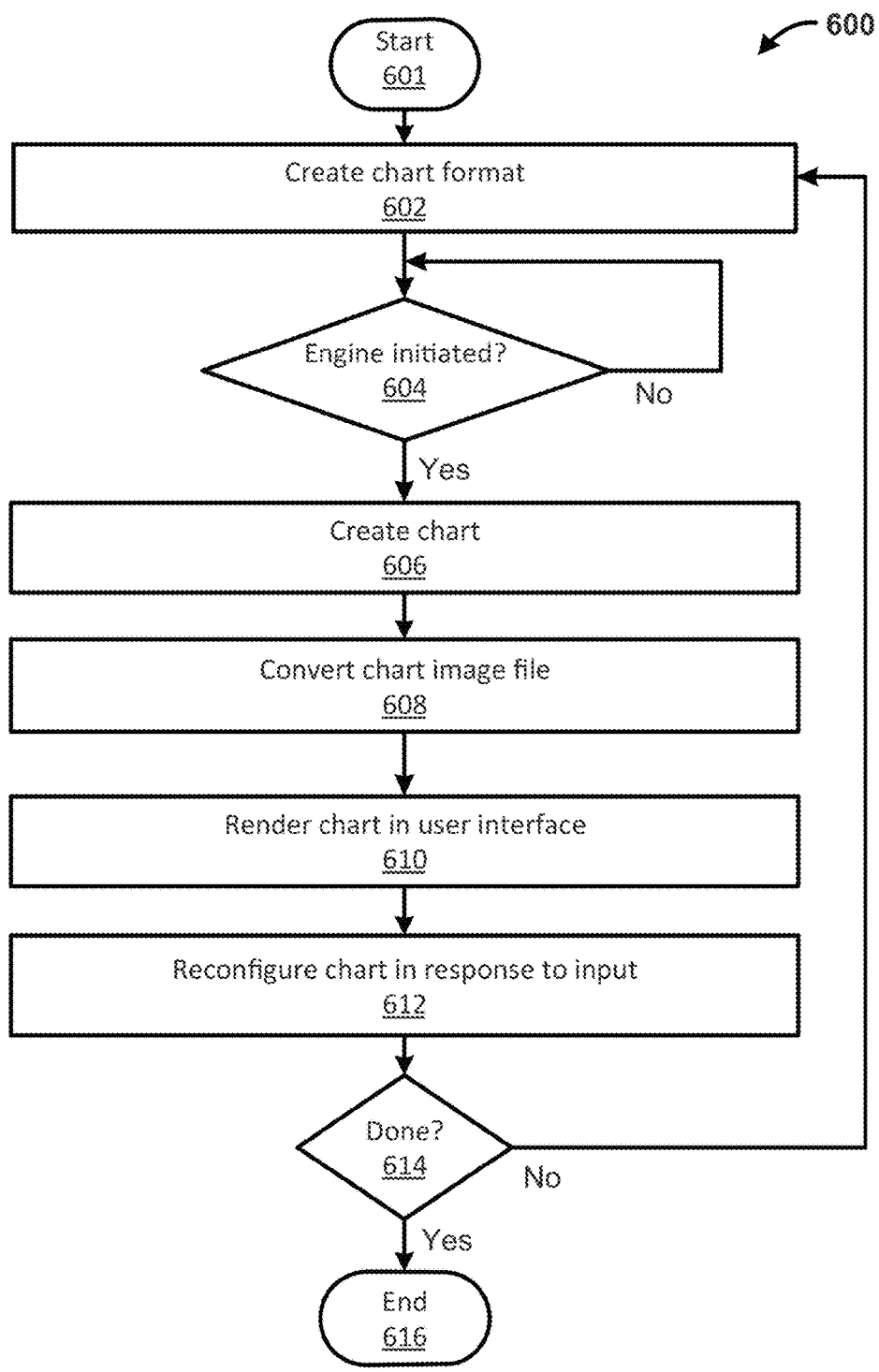
FIG. 6 is a flow diagram of an example method adapted for use with implementations, and variations thereof, illustrated in FIGS. 1-5.

FIG. 6 is a high-level flow diagram of an example method 600 adapted for use with implementations, and variations thereof, illustrated in FIGS. 1-5. Method 600 may be entered into at 601, for example, by a user activating computing system 100 in order to create the format of one or more data charts, such as data chart 140.

At 602, method 600 creates a chart format, using for example, configuration files, metadata, information, and other data associated with the chart data.

In an implementation at 604 method 600 initiates a data processing engine, such as a JavaScript engine. For example, method 600 may initialize chart data engine 116 in order to process data sets 122 and associated attributes, data elements, and information.

At 606 method 600 creates an instance of a data chart (data chart instance), such as data chart 140. Method 600 may create the data chart visualization through analyzing data values and associated data attributes in order to determine the set or subset of data charts. For example, in this implementation, method 600 may create a data chart format by utilizing a data processing engine, such as chart data engine 116, to analyze data and data attributes in order to discern one or more types of chart formats.

In this illustrative example, as discussed herein, such data may be associated with data attributes that pertain to goods, services, manufacturing, sales, etc. that pertain to data and information associated with business such as departments, regions, employees, salaries, and the like. For example, considering sales data related to departments and business regions, method 600 may be configured to interpret the data and attributes and determine since the data sources are related to sales having attributes of departments and regions, "Bar" charts and "Funnel" charts would be the best starting chart given such a chart is used to display different stages of a sales process over different departments and/or regions.

At 608, the instance of the data chart from 606 is converted to an image file for use with a display as an interactive image file and is rendered in a graphical user interface display at 610. For example, as illustrated in FIGS. 1, 2A-2G and 3, method 600 may invoke the use of chart data engine 116, rendering ending 118, toolkit 320, and graphical interface 200 in order to create an instance of dynamic sample chart 310 and/or rendered as data chart 140.

At 612, method 600 dynamically reconfigures the data chart instance in response to a user input. For example, as illustrated in FIGS. 1, 2D-2G and 3, method 600 may invoke the use of chart data engine 116, toolkit 302, and graphical interface 200 in order to generate updated versions of dynamic sample chart 310 and/or data chart 140 displayed to such user.

At 614, method 600 determines whether method 600 is complete. If method 600 is not complete, method 600 returns to 602. If method 600 is complete, method 600 ends at 616.

Figure 7:
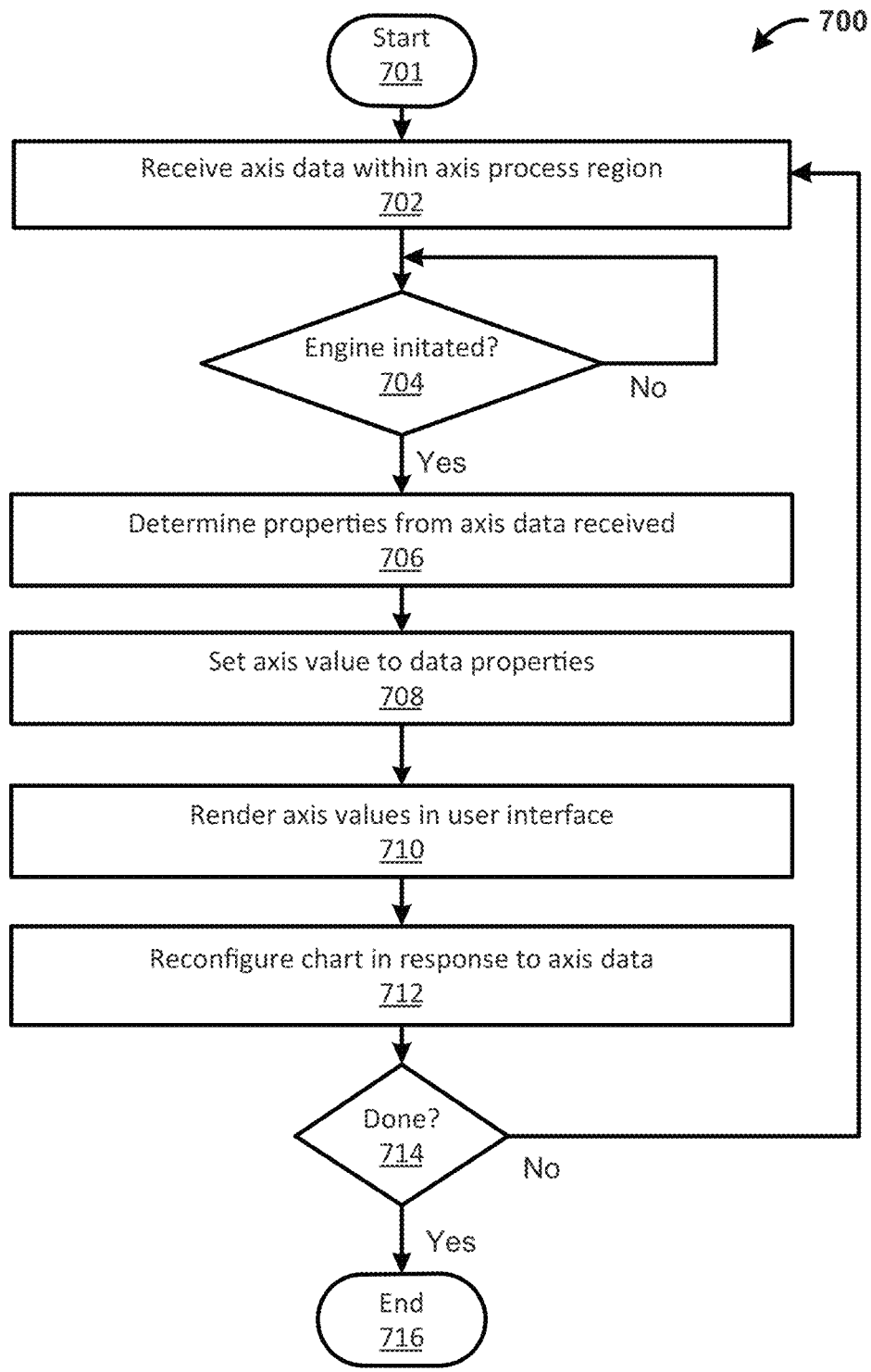
FIG. 7 is a flow diagram of an example method adapted for use with implementations, and variations thereof, illustrated in FIGS. 1-6.

FIG. 7 is a flow diagram of an example method 700 adapted for use with implementations, and variations thereof, illustrated in FIGS. 1-6. Method 700 may be entered into at 701, for example, by a user activating computing system 100 in order set the coordinate data being graphed on data charting visualization. At 702, method 700 detects and receives one or more data interface components 210 associated with one or more data sets 122 into one or more data interface regions 211 invoking one or more processes at 704 to process such data interface components 210 received.

At 706, once data interface components 210 are received, method 700 uses such one or more processes to analyze the data interface components 210 and associated data sets 122, metadata, and information to determine the coordinate values, labels, and other aspects of the data chart such as the color of the data value for display. For example, as illustrated in FIGS. 1, 2D-2G and 3, method 700 may invoke the use of chart data engine 116, toolkit 302, and graphical interface 200 in order to receive and process data interface components 210 received into data interface regions 211, which then may be rendered in real-time as dynamic data chart 310 and/or rendered as data chart 140.

At 708, method 700 proceeds to set the axis values associated with the data interface region 211 used to receive the data interface components 210, and then renders such axis values within a data chart visualization at 710. In this illustration, given a "Bar" chart, data received into data interface regions 211 that relate to the X-axis coordinates would indicate that such values are to be plotted along the X-axis of the data chart visualization. For example, as illustrated in FIGS. 1, 2D-2G and 3, method 700 may invoke the use of chart data engine 116, rendering engine 118, toolkit 302, and graphical interface 200 in order to display a plot of data values for data interface components 210 placed into data interface regions 211 to display values related to "AvgSalary in the Y-Axis, "Region" in the X-Axis, and "Dept." as a bar graph label, which is rendered dynamic data chart 310 and/or rendered as data chart 140.

At 712, as data interface components 210 are added or removed from the data interface regions 211, method 700 reconfigures the data chart visualization accordingly. For example, as illustrated in FIGS. 1, 2D-2G and 3, method 700 may invoke the use of chart data engine 116, rendering engine 118, toolkit 302, and graphical interface 200 in order to display a plot of data values for data interface components 210 placed into data interface regions 211 to display values related to "AvgSalary in the Y-Axis, "Region" in the X-Axis, and "Dept." as a bar graph label, rendering dynamic data chart 310 and/or data chart 140.

When a user adds, removes, or updates data interface components 210 such as "Region," method 700 updates data chart 140 accordingly. For example, by the addition of the data interface component 210C labeled as "Region," data chart 140 is updated to a different version, which includes departments for "two regions," as shown in FIG. 2G.

At 714, method 700 determines if the method 700 is complete, for example, by a user ending method 700, and if not returns to 702, and if so, ends at 716.

Figure 8:
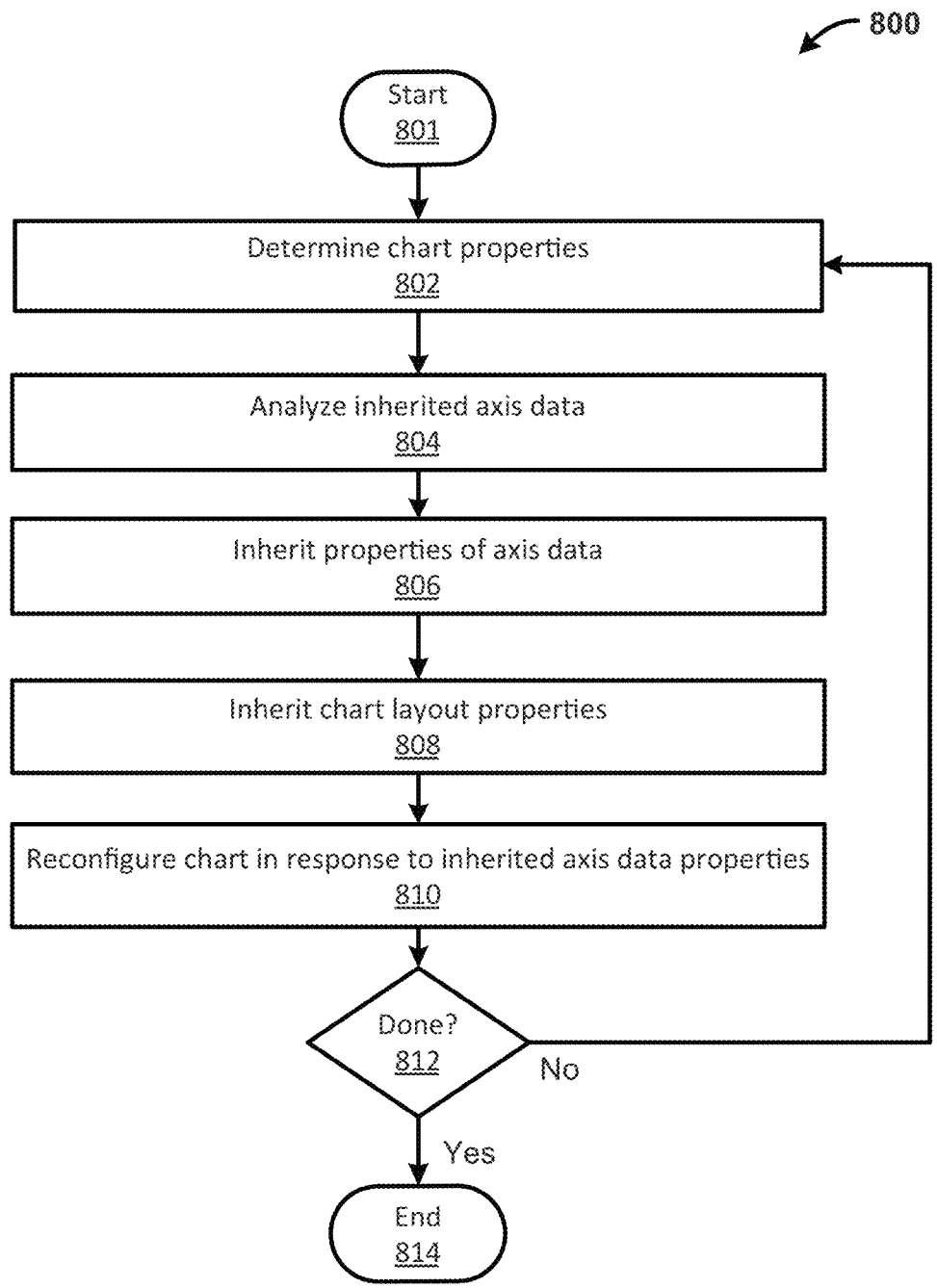
FIG. 8 is a flow diagram of an example method adapted for use with implementations, and variations thereof, illustrated in FIGS. 1-7.

FIG. 8 is a flow diagram of an example method 800 adapted for use with implementations, and variations thereof, illustrated in FIGS. 1-7. Method 800 may be entered into at 801, for example, by a user activating computing system 100 in order set the coordinate data being graphed.

At 802, method 800 determines the properties of the data chart being generated. In one implementation, method 800 determines the properties of the chart by inheriting attributes associated with data being charted. For example, as illustrated in FIGS. 1, 2A-2G and 3, method 800 may invoke the use of chart data engine 116, rendering engine 118, and graphical interface 200 to determine which chart properties to inherit.

At 804, method 800 analyzes the data received to determine which properties of the axis data and chart layout to inherit, and then inherits the axis properties at 806. For example, as illustrated in FIGS. 1, 2A-2G and 3, method 800 may invoke the use of chart data engine 116, rendering engine 118, toolkit 302 and graphical interface 200 in order to determine inherited display values from data interface components 210 related to "AvgSalary in the Y-Axis, "Region" in the X-Axis, and "Dept." as a bar graph label, and thereby generating dynamic sample chart 310 and/or data chart 140.

At 808, method 800 inherits chart layout properties. For example, as illustrated in FIGS. 1, 2A-2G and 3, method 800 may invoke the use of chart data engine 116, rendering engine 118, toolkit 302, and graphical interface 200 in order to determine inherited display values from data interface components 210 related to "AvgSalary in the Y-Axis, "Region" in the X-Axis, and "Dept." as a bar graph label, and thereby generating the department bars groupings 220A and 220B of data chart 140 illustrated in FIG. 2G.

At 810, as chart properties are added or removed from the data interface regions, method 800 reconfigures the data chart visualization accordingly. At 812, method 800 determines if the method 800 is complete, for example, by a user ending one or more process of method 800, and if not returns to 802, and if so ends at 816.

Figure 9:
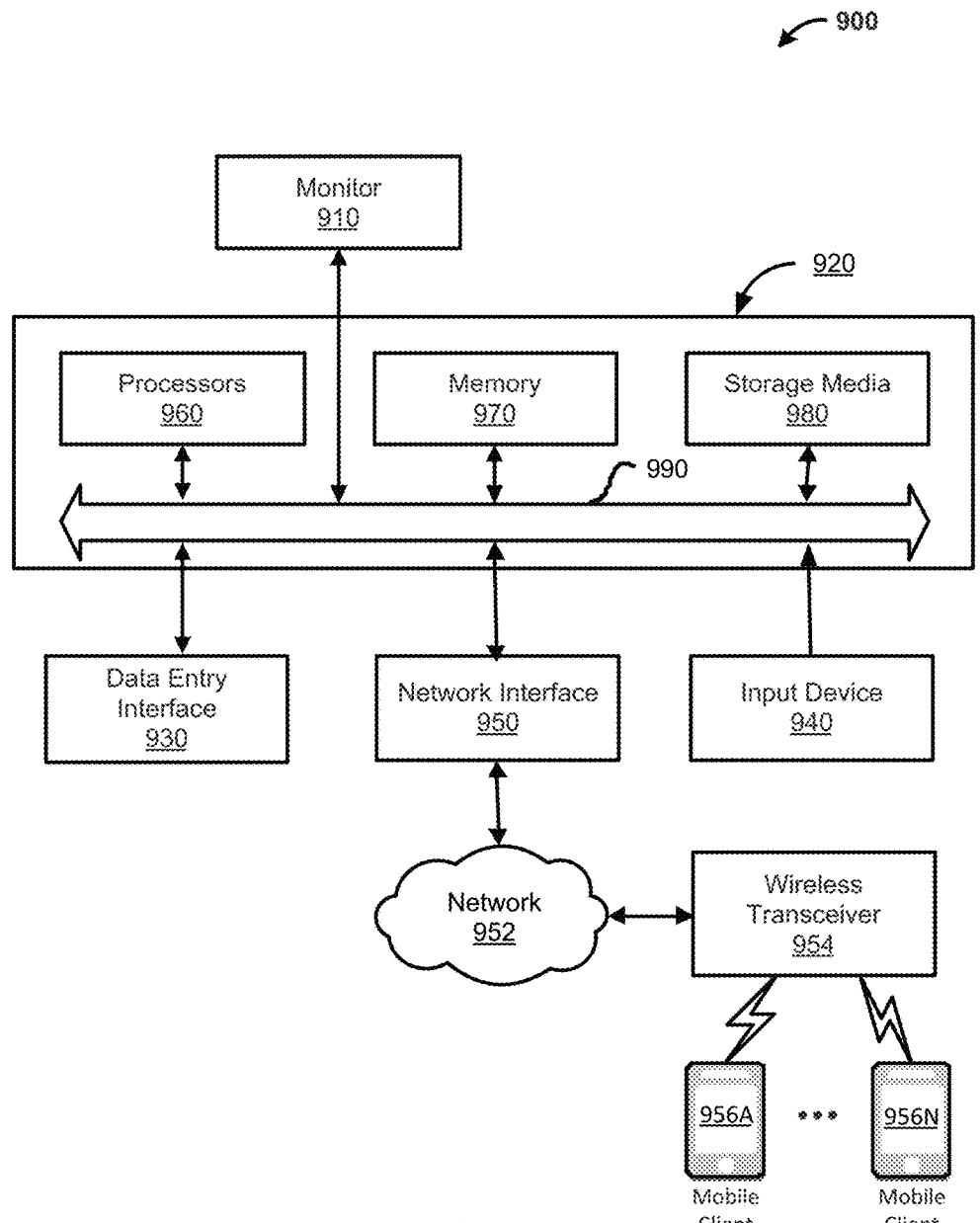
FIG. 9 is a high-level block diagram of an exemplary computer and communication system.

FIG. 9 is a block diagram of an exemplary computer system 900 for use with implementations described in FIGS. 1-8. Computer system 900 is merely illustrative and not intended to limit the scope of the claims. One of ordinary skill in the art would recognize other variations, modifications, and alternatives. For example, computer system 900 may be implemented in a distributed client-server configuration having one or more client devices in communication with one or more server systems.

In one exemplary implementation, computer system 900 includes a display device 910 such as a monitor 910, computer 920, a data entry device 930 such as a keyboard, touch device, and the like, a user input device 940, a network communication interface 950, and the like.

User input device 940 is typically embodied as a computer mouse, a trackball, a track pad, wireless remote, tablet, touch screen, and the like. Moreover, user input device 940 typically allows a user to select and operate objects, icons, text, characters, and the like that appear, for example, on the monitor 910.

Network interface 950 typically includes an Ethernet card, a modem (telephone, satellite, cable, ISDN), (asynchronous) digital subscriber line (DSL) unit, and the like. Further, network interface 950 may be physically integrated on the motherboard of computer 920, may be a software program, such as soft DSL, or the like.

Computer system 900 may also include software that enables communications over communication network 952 such as the HTTP, TCP/IP, RTP/RTSP, protocols, wireless application protocol (WAP), IEEE 802.11 protocols, and the like. In addition to and/or alternatively, other communications software and transfer protocols may also be used, for example IPX, UDP or the like.

Communication network 952 may include a local area network, a wide area network, a wireless network, an Intranet, the Internet, a private network, a public network, a switched network, or any other suitable communication network, such as for example Cloud networks. Communication network 952 may include many interconnected computer systems and any suitable communication links such as hardwire links, optical links, satellite or other wireless communications links such as BLUETOOTH, WIFI, wave propagation links, or any other suitable mechanisms for communication of information. For example, communication network 952 may communicate to one or more mobile wireless devices 956A-N, such as mobile phones, tablets, and the like, via a base station such as wireless transceiver 954.

Computer 920 typically includes familiar computer components such as a processor 960, and memory storage devices, such as a memory 970, e.g., random access memory (RAM), storage media 980, and system bus 990 interconnecting the above components. In one embodiment, computer 920 is a PC compatible computer having multiple microprocessors. While a computer is shown, it will be readily apparent to one of ordinary skill in the art that many other hardware and software configurations are suitable for use with the present invention.

Memory 970 and Storage media 980 are examples of non-transitory tangible media for storage of data, audio/video files, computer programs, and the like. Other types of tangible media include disk drives, solid-state drives, floppy disks, optical storage media such as CD-ROMS and bar codes, semiconductor memories such as flash drives, flash memories, read-only-memories (ROMS), battery-backed volatile memories, networked storage devices, Cloud storage, and the like.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A computer implemented method comprising:
rendering a graphical user interface for displaying a data chart visualization on a computer the client device;
rendering a first data interface region of the graphical user interface, wherein the first data interface region in combination with a data visualization software engine receives, detects, and analyzes data interface components disposed within the first data interface region;
receiving a first data interface component bound to a first data set which includes a first set of data attributes pertaining to a first data chart;
when the first data interface component is received into the first data interface region, analyzing the first data set and the first set of data attributes;
in response to analyzing the first data set and the first set of data attributes, determining a first data chart configuration to present to a user for selection thereof;
determining a configuration of the first data chart in response to the first data set and the first set of data attributes;
analyzing the first data interface component to determine a mapping of the first set of data attributes to display elements of the first data chart;
mapping the first set of data attributes to the display elements of the first data chart;
analyzing the first data set to determine first data chart values to display;
rendering the first data chart with the first data chart values according to the first data chart configuration;
wherein prior to generating the first data chart generating a dynamic sample chart configured to update in real-time in response to receiving one or more drag and drop inputs into the first data interface region and requiring one or more drag and drop inputs into a second data interface region by the user to transform the dynamic sample chart from a one-dimensional dynamic sample chart visualization into a two-dimensional dynamic sample chart visualization; and
rendering a third data interface region wherein the third data interface region is configured to generate chart legends for the first data chart in response to a drag and drop operation receiving a second set of data attributes bound to the first data set.

2. The method of claim 1, wherein the rendering the first data interface region comprises configuring the first data interface region as a one-way data interface region of a display, wherein the one-way data interface region is configured to receive data from the first data set bound to the first data interface component.

3. The method of claim 1, wherein the rendering the first data interface region comprises configuring the first data interface region as a two-way data interface region of a display, wherein the two-way data interface region is configured to exchange data between the first data set bound to the first data interface component and the charting data visualization.

4. The method of claim 1, wherein the rendering the first data interface region comprises configuring the first data interface region as a data inheriting region of a display, wherein the data inheriting region is configured to inherit data and properties from the first data interface component.

5. The method of claim 1, wherein the rendering the first data interface region comprises configuring the first data interface region as a data inheriting region of a display, wherein the data inheriting region is configured to inherit data and properties from the first data interface component, and provide an interface for the first data interface component to inherit properties and data from the data inheriting region pertaining to the data chart visualization.

6. The method of claim 1, wherein the determining the first data chart configuration comprises analyzing the first data set and the first set of data attributes to determine a type of first data chart to display.

7. The method of claim 1, wherein the determining the first data chart configuration comprises analyzing the first data set and the first set of data attributes to determine coordinates of the first data set onto the data chart visualization.

8. The method of claim 1, wherein the determining the first data chart configuration comprises analyzing the first data set and the first set of data attributes to determine a data chart layout of the first data set onto the data chart visualization.

9. The method of claim 1, wherein the analyzing the first data interface component comprises processing the first set of data attributes to determine a type of chart for graphing the first data set onto the data chart visualization.

10. The method of claim 1, further comprising determining a display axis for the first data set by determining the display axis associated with the first data interface region.

11. The method of claim 1, further comprising a data list display region configured to receive and process the first data set and first set of data attributes, wherein the data list display region establishes a data hierarchy and corresponding data structure and visually separates the first set of data attributes into the data hierarchy for selection by a user thereof for supplying the one or more drag and drop inputs to the first data interface region, the second data interface region, and the third data interface region.

12. The method of claim 1, further comprising:
receiving a second data set bound to a second data interface component, wherein the second data interface component includes a second set of data attributes pertaining to the charting data visualization;
receiving the second data interface component into the first data interface region;
when the second data interface component is received in the first data interface region, determining a second configuration of the first data chart in response to the first set of data attributes and the second set of data attributes;
generating the second configuration of the first data chart in accordance with the first set of data attributes and the second set of data attributes;
analyzing the second data interface component to determine the mapping of the second set of data attributes to the display elements of the first data chart;
mapping the second set of data attributes to the display elements of the first data chart;
analyzing the second data set to determine chart values to display; and
rendering a second version of the first data chart in accordance with the second configuration of the first data chart as a second data chart.

13. The method of claim 12, wherein determining the second configuration comprises analyzing the first set of data attributes and the second set of data attributes to determine a type of chart for graphing the first data set and the second data set onto the data chart visualization forming the second data chart.

14. The method of claim 12, wherein determining the second configuration comprises determining a data hierarchy between the first data set and the second data set by analyzing a graphical position between the first data interface component and the second data interface component in the first data interface region.

15. The method of claim 12, wherein determining the second configuration comprises determining a layout for the second data chart by analyzing the first set of data attributes and the second set of data attributes.

16. The method of claim 12, wherein determining the second configuration comprises determining a display schema for the second data chart by analyzing the first set of data attributes and the second set of data attributes.

17. The method of claim 12, wherein prior to generating the second data chart generating the dynamic sample chart configured to update in real-time in response to user input.

18. The method of claim 17, wherein the dynamic sample chart is generated from a toolkit comprising the first data interface component, the second data interface component, and a plurality of types of second charts for selection thereof.

19. An apparatus for charting data in a computing environment, the computing environment comprising one or more computing devices in communication with a chart data software application, wherein the chart data software application executes software, wherein the software provides displayable information accessible to the one or more computing devices, a computing device of the one or more computing devices configured to:
render a graphical user interface for displaying a data chart visualization on a client device;
render a first data interface region of the graphical user interface, wherein the first data interface region in combination with a data visualization software engine receives, detects, and analyzes data interface components positioned in the first data interface region;
receive a first data interface component bound to a first data set which includes a first set of attributes pertaining to a first data chart;
when the first data interface component is received into the first data interface region, analyze the first data set and the first set of attributes;
in response to the analysis of the first data set and the first set of data attributes, determine a first data chart configuration to present to a user for selection thereof;
configure the first data chart in response to the first data set and the first set of data attributes;
analyze the first data interface component to determine a mapping of the first set of data attributes to display elements of the first data chart;
map the first set of data attributes to the display elements of the first data chart;
analyze the first data set to determine first data chart values to display on the first data chart;
render the first data chart with the first data chart values according to the first data chart configuration;
wherein prior to generating the first data chart generating a dynamic sample chart configured to update in real-time in response to receiving one or more drag and drop inputs into the first data interface region and requiring one or more drag and drop inputs into a second data interface region by the user to transform the dynamic sample chart from a one-dimensional dynamic sample chart visualization into a two-dimensional dynamic sample chart visualization; and
rendering a third data interface region wherein the third data interface region is configured to generate chart legends for the first data chart in response to a drag and drop operation receiving a second set of data attributes bound to the first data set.

20. A tangible non-transitory storage medium including instructions executable by one or more servers of a server system for charting data in a computing environment, the computing environment including one or more computing devices in communication with a software application, wherein the software application executes software, wherein the software provides displayable information accessible to the one or more computing devices, the tangible storage medium including instructions for:

rendering a graphical user interface for displaying a data chart visualization on a client device;

rendering a first data interface region of the graphical user interface, wherein the first data interface region in combination with a data visualization software engine receives, detects, and analyzes data interface components positioned in the first data interface region;

receiving a first data interface component bound to a first data set which includes a first set of attributes pertaining to a first data chart;

when the first data interface component is received into the first data interface region, analyzing the first data set and the first set of attributes;

in response to analyzing the first data set and the first set of data attributes, determining a first data chart configuration to present to a user for selection thereof;

determining a configuration of the first data chart in response to the first data set and the first set of data attributes;

analyzing the first data interface component to determine a mapping of the first set of data attributes to the first data chart;

mapping the first set of data attributes to display elements of the first data chart;

analyzing the first data set to determine first data chart values to display;

rendering the first data chart with the first data chart values according to the first data chart configuration;

wherein prior to generating the first data chart generating a dynamic sample chart configured to update in real-time in response to receiving one or more drag and drop inputs into the first data interface region and requiring one or more drag and drop inputs into a second data interface region by the user to transform the dynamic sample chart from a one-dimensional dynamic sample chart visualization into a two-dimensional dynamic sample chart visualization; and rendering a third data interface region wherein the third data interface region is configured to generate chart legends for the first data chart in response to a drag and drop operation receiving a second set of data attributes bound to the first data set.

\* \* \* \* \*

UNITED STATES PATENT AND TRADEMARK OFFICE
CERTIFICATE OF CORRECTION

| | | |
|---|---|---|
| PATENT NO. | : 9,892,531 B2 | Page 1 of 1 |
| APPLICATION NO. | : 14/789430 | |
| DATED | : February 13, 2018 | |
| INVENTOR(S) | : Csenteri et al. | |

It is certified that error appears in the above-identified patent and that said Letters Patent is hereby corrected as shown below:

In the Specification

In Column 12, Line 57, delete "JDEVLOPER" and insert -- JDEVELOPER --, therefor.

In Column 13, Line 34, delete "406B-40N" and insert -- 406B-406N --, therefor.

In the Claims

In Column 20, Line 4, in Claim 1, after "computer" delete "the".

Signed and Sealed this
Twenty-eighth Day of August, 2018

Andrei Iancu
*Director of the United States Patent and Trademark Office*